US010264131B2

(12) United States Patent
Hamada et al.

(10) Patent No.: US 10,264,131 B2
(45) Date of Patent: Apr. 16, 2019

(54) TRANSMISSION CONTROL SYSTEM, TRANSMISSION SYSTEM, AND METHOD OF TRANSMISSION CONTROL

(71) Applicants: Yuuta Hamada, Tokyo (JP); Takahiro Asai, Kanagawa (JP)

(72) Inventors: Yuuta Hamada, Tokyo (JP); Takahiro Asai, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 124 days.

(21) Appl. No.: 15/245,876

(22) Filed: Aug. 24, 2016

(65) Prior Publication Data
US 2016/0366281 A1 Dec. 15, 2016

Related U.S. Application Data

(63) Continuation of application No. PCT/JP2015/054666, filed on Feb. 19, 2015.

(30) Foreign Application Priority Data

Feb. 28, 2014 (JP) ................. 2014-038656

(51) Int. Cl.
*H04M 3/56* (2006.01)
*H04N 7/15* (2006.01)
*H04L 29/06* (2006.01)

(52) U.S. Cl.
CPC .......... *H04M 3/567* (2013.01); *H04L 65/403* (2013.01); *H04L 65/60* (2013.01); *H04L 65/605* (2013.01); *H04N 7/152* (2013.01)

(58) Field of Classification Search
CPC ......... G06F 13/00; H04L 65/00; H04L 65/60; H04M 3/567; H04N 7/152
(Continued)

(56) References Cited

U.S. PATENT DOCUMENTS 5,737,010 A * 4/1998 Yachi ................. H04N 7/152
348/14.09
6,209,021 B1 * 3/2001 Ahimovic ............. G06F 9/543
348/E7.081
(Continued)

FOREIGN PATENT DOCUMENTS

EP 2 363 994 A1 9/2011
JP 2002-007296 1/2002
(Continued)

OTHER PUBLICATIONS

International Search Report dated May 19, 2015 in PCT/JP2015/054666 filed on Feb. 19, 2015 (with English translation).
(Continued)

*Primary Examiner* — Stephen J Clawson
(74) *Attorney, Agent, or Firm* — Oblon, McClelland, Maier & Neustadt, L.L.P.

(57) ABSTRACT

A transmission control system capable of transmitting data received from a first transmission terminal to a second transmission terminal, includes a receiver unit to receive identification information to identify the second transmission terminal or a user of the second transmission terminal, the data, and first type information that represents a type of the data, from the first transmission terminal; and a transmission control unit to control the received data not to be transmitted to the second transmission terminal in a case where the received first type information is not included in second type information corresponding to the received identification information, the second type information being managed in a management unit configured to have identification information to identify a predetermined transmission terminal or a user of the transmission terminal, associated with the second type information that represents a
(Continued)

type of data processable by the predetermined transmission terminal.

5 Claims, 27 Drawing Sheets

(58) Field of Classification Search
USPC .......................................................... 370/260
See application file for complete search history.

(56) References Cited

U.S. PATENT DOCUMENTS

| | | | |
|---|---|---|---|
| 8,830,296 B1* | 9/2014 | Vivekanandan | H04N 7/152 348/14.09 |
| 8,885,008 B2 | 11/2014 | Okita et al. | |
| 9,332,225 B2* | 5/2016 | Wu | H04N 7/152 |
| 2002/0026645 A1* | 2/2002 | Son | H04L 12/2801 725/117 |
| 2002/0047899 A1* | 4/2002 | Son | H04L 12/2801 348/114 |
| 2002/0126201 A1* | 9/2002 | Schmitt | H04N 7/152 348/14.09 |
| 2004/0114032 A1 | 6/2004 | Kakii et al. | |
| 2005/0125696 A1* | 6/2005 | Afshar | H04M 7/006 726/4 |
| 2005/0160367 A1* | 7/2005 | Sirota | G06Q 10/109 715/753 |
| 2006/0107290 A1* | 5/2006 | Kado | H04N 5/4401 725/38 |
| 2006/0215765 A1 | 9/2006 | Hwang et al. | |
| 2010/0004014 A1* | 1/2010 | Coulombe | H04W 88/181 455/519 |
| 2010/0274909 A1* | 10/2010 | Mochida | H04M 3/567 709/227 |
| 2011/0216699 A1* | 9/2011 | Umehara | H04L 12/1813 370/328 |
| 2012/0263168 A1* | 10/2012 | Petrack | H04M 7/1205 370/352 |
| 2013/0135346 A1 | 5/2013 | Sakuramata et al. | |
| 2013/0198795 A1 | 8/2013 | Eleftheriadis et al. | |
| 2014/0156854 A1* | 6/2014 | Gaetano, Jr. | H04L 65/1069 709/227 |
| 2015/0002613 A1* | 1/2015 | Hori | H04N 7/15 348/14.08 |
| 2015/0015661 A1* | 1/2015 | Kondo | H04N 7/147 348/14.08 |
| 2016/0366281 A1* | 12/2016 | Hamada | G06F 13/00 |

FOREIGN PATENT DOCUMENTS

| | | |
|---|---|---|
| JP | 2003-309584 | 10/2003 |
| JP | 2004-260362 | 9/2004 |
| JP | 2005-189994 | 7/2005 |
| JP | 2008-047122 | 2/2008 |
| JP | 2011-205617 | 10/2011 |
| JP | 2012-075073 | 4/2012 |
| JP | 2013-065125 | 4/2013 |
| JP | 2013-131204 | 7/2013 |
| JP | 2013-182534 | 9/2013 |
| JP | 2015-070543 | 4/2015 |

OTHER PUBLICATIONS

Written Opinion dated May 19, 2015 in PCT/JP2015/054666 filed on Feb. 19, 2015.
Extended European Search Report dated Mar. 27, 2017 in Patent Application No. 15754925.4.

* cited by examiner

FIG.10
| OPERATIONAL STATE | VISUAL INFORMATION (ICON) |
|---|---|
| ONLINE (READY TO COMMUNICATE) |  |
| ONLINE (COMMUNICATING) |  |
| ONLINE (SUSPENDED) |  |
| OFFLINE |  |

FIG.13

| PAGE DATA ID | START TIME | FINISH TIME | STROKE ARRAY DATA ID | MEDIA DATA ID |
|---|---|---|---|---|
| p001 | 20130610102434 | 20130610102802 | st001 | m001 |
| p002 | 20130610102815 | 20130610103225 | st002 | m002 |
| p003 | 20130610103545 | 20130610104233 | st003 | m003 |
| ... | ... | ... | ... | ... |

FIG.16

| MEDIA DATA ID | DATA TYPE | RECORD OF TIME | X COORDINATE | Y COORDINATE | WIDTH | HEIGHT | DATA |
|---|---|---|---|---|---|---|---|
| m001 | IMAGE | 20130610103432 | 0 | 0 | 1920 | 1080 | abc.jpg |
| m002 | IMAGE | 20130610105402 | 277 | 156 | 1366 | 768 | bcd.jpg |
| m003 | IMAGE | 20130610105017 | 277 | 156 | 1366 | 768 | cde.jpg |
| ... | ... | ... | ... | ... | ... | ... | ... |

FIG.18

| TERMINAL ID | PASSWORD |
|---|---|
| 01aa | aaaa |
| 01ab | abab |
| 01ba | baba |
| ... | ... |

FIG. 19

| TERMINAL ID | TERMINAL NAME | IP ADDRESS | OPERATIONAL STATE | TYPE INFORMATION |
|---|---|---|---|---|
| 01aa | CALL TERMINAL AA | 1.2.1.3 | ONLINE (READY TO COMMUNICATE) | IMAGE, SOUND, TEXT |
| 01ab | CALL TERMINAL AB | 1.2.1.4 | ONLINE (SUSPENDED) | IMAGE, SOUND, TEXT |
| ... | ... | ... | ... | ... |
| 01ba | CALL TERMINAL BA | 1.2.2.3 | ONLINE (READY TO COMMUNICATE) | IMAGE, SOUND, TEXT |
| 01bb | CALL TERMINAL BB | 1.2.2.4 | ONLINE (COMMUNICATING) | IMAGE, SOUND, TEXT |
| ... | ... | ... | ... | ... |
| 01ca | CALL TERMINAL CA | 1.3.1.3 | ONLINE (READY TO COMMUNICATE) | IMAGE, SOUND, TEXT |
| 01cb | CALL TERMINAL CB | 1.3.1.4 | OFFLINE | IMAGE, SOUND, TEXT |
| ... | ... | ... | ... | ... |
| 01da | CALL TERMINAL DA | 1.3.2.3 | ONLINE (COMMUNICATING) | IMAGE, SOUND, TEXT |
| 01db | CALL TERMINAL DB | 1.3.2.4 | ONLINE (COMMUNICATING) | IMAGE, SOUND, TEXT |
| ... | ... | ... | ... | ... |
| 02aa | ELECTRONIC BLACK BOARD A | 1.2.1.9 | OFFLINE | IMAGE, COORDINATE |
| 02ba | ELECTRONIC BLACK BOARD B | 1.2.2.9 | OFFLINE | IMAGE, COORDINATE |
| 02ca | ELECTRONIC BLACK BOARD C | 1.3.1.9 | OFFLINE | IMAGE, COORDINATE |
| 02da | ELECTRONIC BLACK BOARD D | 1.3.2.9 | OFFLINE | IMAGE, COORDINATE |
| ... | ... | ... | ... | ... |

FIG.20

| TERMINAL ID OF STARTER TERMINAL | TERMINAL IDS OF DESTINATION CANDIDATES |
|---|---|
| 01aa | 01ab,・・・,01ba,01bb,・・・,01ca,01cb,02aa,02ba |
| 01ab | 01aa,01ca,01cb,02ca |
| 01ba | 01aa,01ab,01ca,01cb,01da,01db |
| ... | ... |

FIG.21

| SESSION ID | TERMINAL ID |
|---|---|
| se1 | 01ab,02ca |
| se2 | 01ba,01da |
| se3 | 02aa,02ba |
| ... | ... |

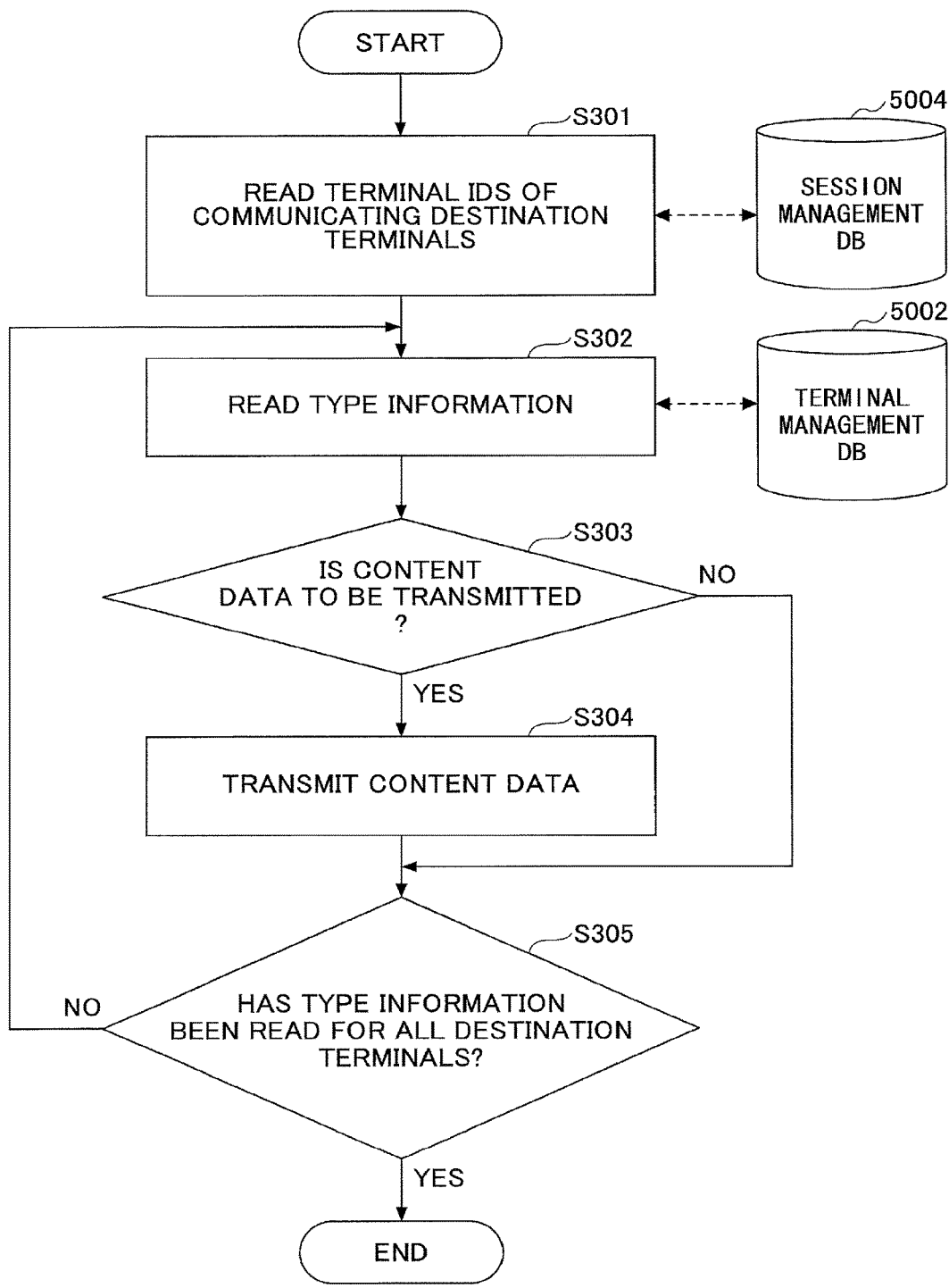

TRANSMISSION CONTROL SYSTEM, TRANSMISSION SYSTEM, AND METHOD OF TRANSMISSION CONTROL

CROSS-REFERENCE TO RELATED APPLICATIONS

This application is a continuation application filed under 35 U.S.C. 111(a) claiming the benefit under 35 U.S.C. 120 and 365(c) of a PCT International Application No. PCT/JP2015/054666 filed on Feb. 19, 2015, which is based upon and claims the benefit of priority of Japanese Patent Application No. 2014-038656, filed on Feb. 28, 2014, with the Japanese Patent Office, the entire contents of which are hereby incorporated by reference.

BACKGROUND OF THE INVENTION

1. Field of the Invention

The present disclosure relates to an invention about transmitting data received from a transmission terminal to another transmission terminal.

2. Description of the Related Art

Communication systems have become popular to communicate with remote locations via communication networks such as the Internet. As an example of such a data communication system, a conference system for a remote conference may be considered (see Patent Document 1). In a common conference system, a call terminal used by a person concerned who is attending a remote conference on one side converts images of an object and sound in a conference room into digital data, and transmits the data to a call terminal used by a person concerned on the other side via a server (a computer). Next, the call terminal used by the person on the other side displays on a display the images from the one side, and outputs the sound from a loudspeaker. Thus, a conference between remote locations can be held in a state close to an actual conference.

Also, electronic blackboards have been used for remote communication in companies, educational institutions, administrative agencies, and the like. Such an electronic blackboard can display a background image and a UI image (an operational image) on a display, and a user can draw a stroke image of characters, digits, figures, or the like on this background image (see Patent Document 2). This stroke image, which represents contents drawn by the user by contacting the display with an electronic pen or a hand, is drawn by the electronic blackboard that electronically converts the contents, and generates coordinates data.

Further, the electronic blackboard can transmit and receive coordinates data and the like with another electronic blackboard or a call terminal described above via a server (a computer). If the electronic blackboard transmits coordinates data to another electronic blackboard via a server (a computer), the other electronic blackboard reproduces the stroke image from the coordinates data, and thus, a stroke image drawn on the electronic blackboard on the one side is displayed on the other electronic blackboard at a remote location. This makes the conference between the remote locations more convenient.

However, a second transmission terminal such as a call terminal incapable of reproducing a stroke image cannot reproduce a stroke image from the coordinates data even if having received the coordinates data from a first transmission terminal such as an electronic blackboard via a server (a computer).

As described above, if the server (the computer) or the like transmits data of a type that cannot be processed by the second transmission terminal, to the second transmission terminal, a problem arise in that the process of transmission is useless because the second transmission terminal cannot process the data.

SUMMARY OF THE INVENTION

According to an embodiment, a transmission control system capable of transmitting data received from a first transmission terminal to a second transmission terminal, includes a receiver unit configured to receive identification information to identify the second transmission terminal or a user of the second transmission terminal, the data, and first type information that represents a type of the data, from the first transmission terminal; and a transmission control unit configured to control the received data not to be transmitted to the second transmission terminal in a case where the received first type information is not included in second type information corresponding to the received identification information, the second type information being managed in a management unit configured to have identification information to identify a predetermined transmission terminal or a user of the transmission terminal, associated with the second type information that represents a type of data processible by the predetermined transmission terminal.

BRIEF DESCRIPTION OF THE DRAWINGS

FIG. 10 is a diagram illustrating a visual information management table;

FIG. 13 is a schematic view illustrating page data;

FIG. 16 is a schematic view illustrating media data;

FIG. 18 is a schematic view of an authentication management DB;

FIG. 19 is a schematic view of a terminal management DB;

FIG. 20 is a schematic view of a destination list management DB;

FIG. 21 is a schematic view of a session management table;

FIG. 28 is a flowchart illustrating a process of determining a transmission destination.

DETAILED DESCRIPTION OF THE PREFERRED EMBODIMENTS

In the following, embodiments will be described with reference to the drawings. Note that the present invention is not limited to the embodiments below, but various modifications and replacements could be made without departing from the scope of the present invention.

In the following, a transmission system will be described with reference to the drawings according to an embodiment.

Note that the transmission system may include a communication system that mutually transfers information, emotions, and the like among multiple terminals. This communication system is a system for mutually transferring information, emotions, and the like among multiple terminals (a "call terminal" and an "electronic blackboard" in the embodiment are examples) via a communication control system (a "transmission control system" in the embodiment is an example), and a TV (video) conference system or the like may be considered as an example.

Overall Configuration of Embodiment

Figure 1:
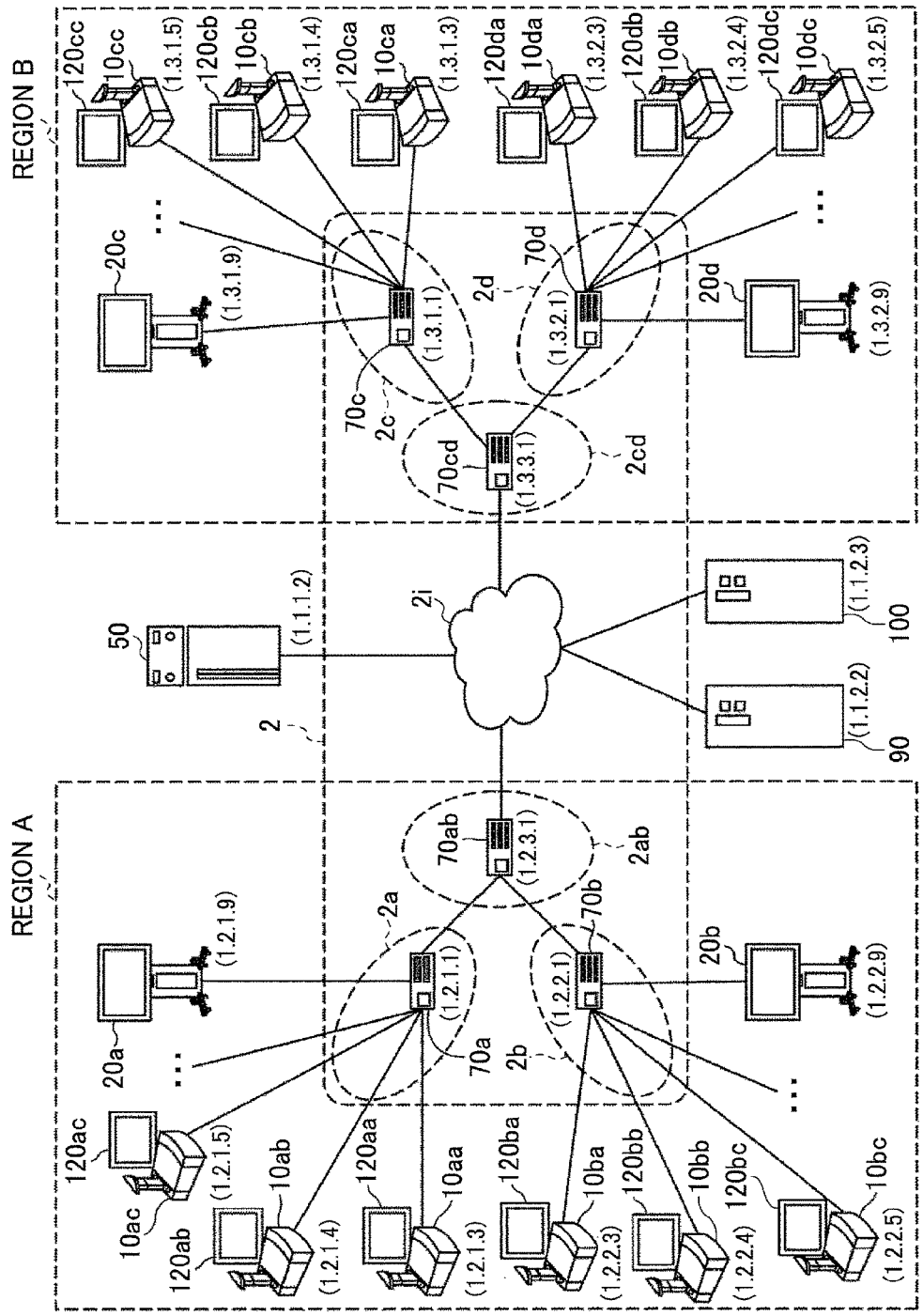
FIG. 1 is an overview of a transmission system according to an embodiment.
Figure 2:
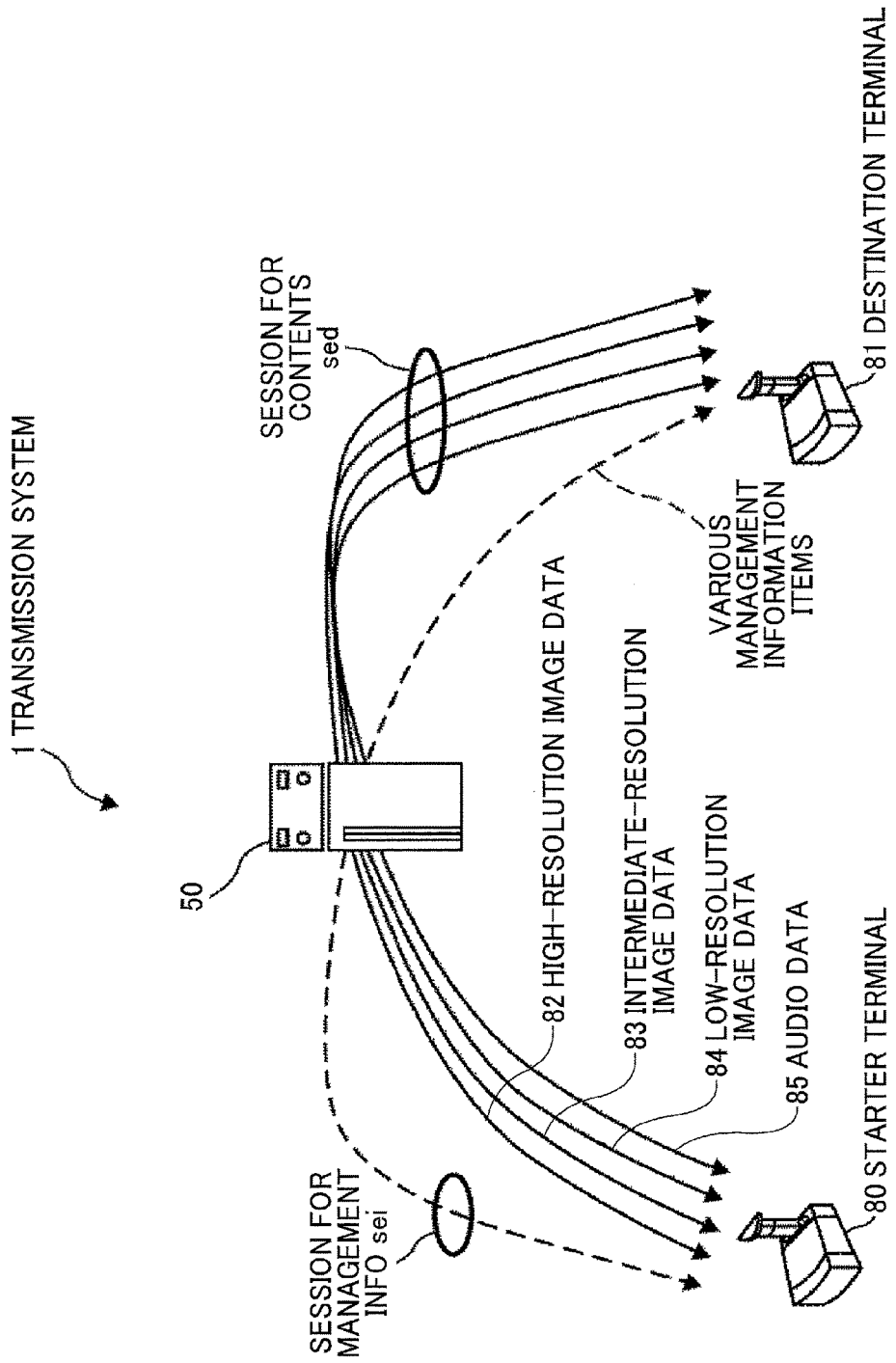
FIG. 2 is a schematic view illustrating a state of reception and transmission of image data, sound data, and various management information items in a transmission system.
Figure 3:
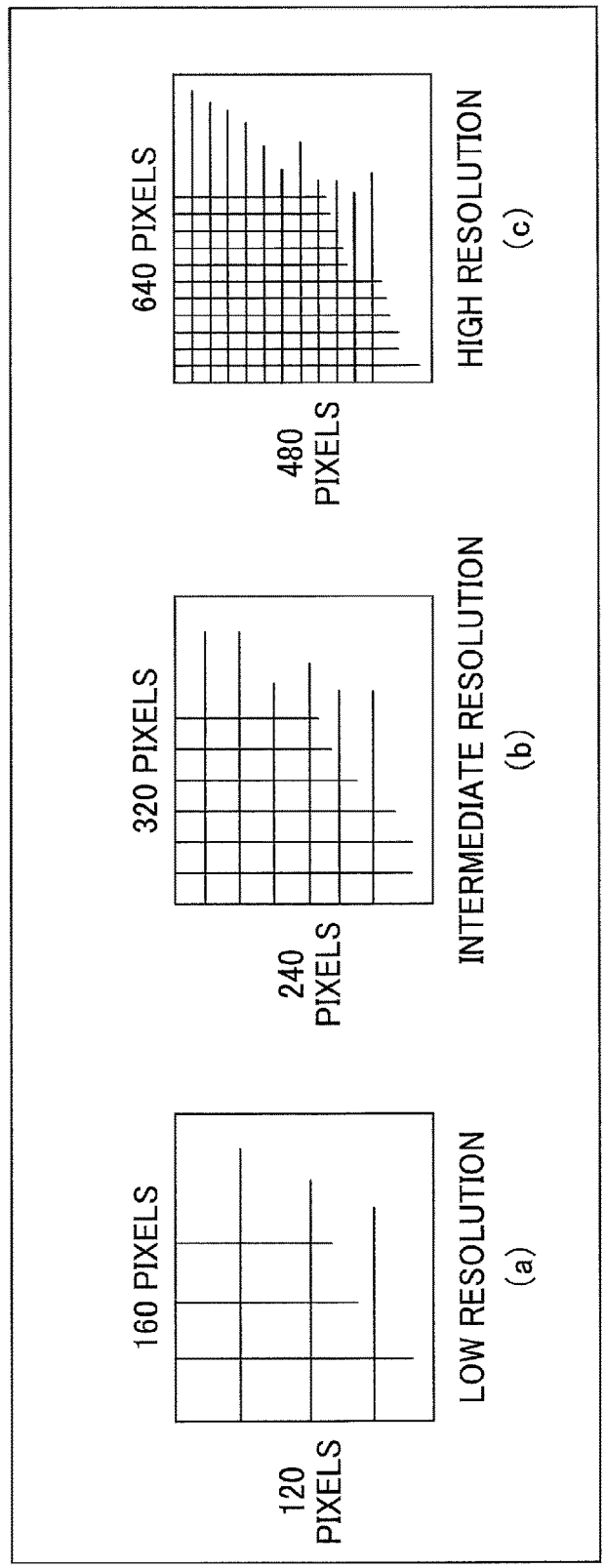
FIG. 3 is a schematic view illustrating picture quality of image data.

First, an overall configuration of the embodiment will be described using FIG. 1 to FIG. 3 FIG. 1 is an overview of a transmission system 1 according to an embodiment. FIG. 2 is a schematic view illustrating a state of reception and transmission of image data, sound data, and various management information items in the transmission system 1. FIG. 3 is a schematic view illustrating picture quality of image data.

First, the transmission system 1 illustrated in FIG. 1 is constituted with multiple call terminals (10*aa*, 10*ab*, ...), displays (120*aa*, 120*ab*, ...) for the call terminals (10*aa*, 10*ab*, multiple electronic blackboards (20*a*, 20*b*, 20*c*, 20*d*), a transmission management system 50, a program providing system 90, and a maintenance system 100.

In the following, an arbitrary one of the multiple call terminals (10*aa*, 10*ab*, ...) will be referred to as a "call terminal 10", and an arbitrary one of the multiple displays (120*aa*, 120*ab*, ...) will be referred to as an "display 120". Also, an arbitrary one of the multiple electronic blackboards (20*a*, 20*b*, 20*c*, 20*d*) will be referred to as an "electronic blackboard 20". Further, the call terminals 10 and the electronic blackboards 20 may be collectively referred to as "transmission terminals" in the embodiment. Also, a call terminal 10 being a request source that requests start of communication for a video-conference or the like will be referred to as a "starter terminal", and a call terminal 10 being a request destination (relay destination) will be referred to as a "destination terminal". This "destination terminal" may be referred to as a "partner terminal".

Also, the call terminal 10 can transmit and receive contents data that is of at least one type among image data, sound data, and text data. Also, the electronic blackboard 20 can transmit and receive contents data that is of at least one type among image data and coordinates data, which will be described later. Note that text data may be data that represents a message used in a chat or the like.

Next, a method of communication will be described using FIG. 2 in a case where both a starter terminal and a destination terminal are call terminals. In the transmission system 1, a session for management information "sei" is established between the starter terminal 80 and the destination terminal 81, to transmit and receive various management information items via the transmission management system 50. Also, four sessions are established between the starter terminal 80 and the destination terminal 81, to transmit and receive four types of data, namely, high-resolution image data 82, intermediate-resolution image data 83, low-resolution image data 84, and sound data (audio data) 85, by using H.264/SVC video encoding standards via the transmission control system 50. Here, these four sessions are collectively illustrated as sessions for contents "sed". Note that although text data or coordinates data may also be transmitted and received in the sessions for contents "sed", the illustration is omitted here. Also, the transmission control system 50 does not necessarily mediate between the starter terminal 80 and the destination terminal 81; the sessions for contents "sed" may be established directly between the starter terminal 80 and the destination terminal 81. Further, such a relationship between the starter terminal 80 and the destination terminal 81 may be applicable not only between a call terminal and a call terminal, but also between a call terminal and an electronic blackboard, between an electronic blackboard and a call terminal, and between an electronic blackboard and an electronic blackboard. In any of these cases, image data is transmitted between the starter terminal 80 and the destination terminal 81, by using H.264/SVC video encoding standards. Also, H.264/SVC is an example of video encoding standards, and other video encoding standards may be used. For example, H.264/AVC, H.265, VP9, and the like may be considered as the other standards.

Here, resolution of image data handled in the embodiment will be described. As illustrated in (c) in FIG. 3, there are a low-resolution image with 160-pixel wide and 120-pixel high as illustrated in (a) in FIG. 3, which is a base image; an intermediate-resolution image with 320-pixel wide and 240-pixel high as illustrated in (b) in FIG. 3; and a high-resolution image with 640-pixel wide and 480-pixel high. Among these, if transferred through a narrow-bandwidth route, low-picture-quality image data is relayed, including only low-resolution images being base images. If the bandwidth of a route is relatively wide, intermediate picture-quality image data is relayed, including low-resolution images being base images, and intermediate-resolution images. If the bandwidth of a route is very wide, high picture-quality image data is relayed, including low-resolution images being base images, intermediate-resolution images, and high-resolution images.

Also, each electronic blackboard 20 illustrated in FIG. 1 is a white board (a copy board) that is used in a company, a school, or the like, with which a user can make drawings by contacting a display 3 with an electronic pen 4 or a hand H, which will be described later, and contents of the drawings are electronically converted to generate stroke array data, which will be described later.

Also, the transmission control system 50 illustrated in FIG. 1 relays contents data among multiple call terminals 10. The transmission control system 50 authenticates a login from a call terminal 10, manages call states of call terminals 10, manages an address list, and the like, in a unified way. Note that images in image data may be moving pictures or still pictures, or may be both moving pictures and still pictures.

Multiple routers (70*a*, 70*b*, 70*c*, 70*d*, 70*ab*, 70*cd*) select optimal paths for image data and audio data. Note that in the following, an arbitrary one of the routers (70*a*, 70*b*, 70*c*, 70*d*, 70*ab*, 70*cd*) will be referred to as a "router 70".

The program providing system 90 includes an HD (Hard Disk) 204, which will be described later, to store a program for a call terminal to implement various functions on the call terminal 10 (or to have the call terminal 10 function as various functional units), and can transmit the program for a call terminal to the call terminal 10. The HD 204 of the program providing system 90 also stores a program for an electronic blackboard to implement various functions on the electronic blackboard 20 (or to have to the electronic blackboard 20 function as various functional units), and can transmit the program for an electronic blackboard to the electronic blackboard 20. The HD 204 of the program providing system 90 further stores a program for transmission control to implement various functions on the transmission management system 50 (or to have the transmission management system 50 function as various functional units), and can transmit the program for transmission control to the transmission management system 50.

The maintenance system 100 is a computer for conservation, management, and maintenance of at least one of the call terminals 10, the transmission control system 50, and the program providing system 90. For example, if the maintenance system 100 is installed domestically, and the call terminals 10, the transmission control system 50, and the program providing system 90 are installed overseas, then, the maintenance system 100 remotely executes conservation, management, and maintenance of at least one of the call terminals 10, the transmission control system 50, and the program providing system 90, via a communication network 2. Also, the maintenance system 100 maintains or manages the product code, manufacturer's serial number, buyer, maintenance checkup, or failure history of at least one of the call terminals 10, the transmission control system 50, and the program providing system 90, without mediated by the communication network 2.

Incidentally, the call terminals (10*aa*, 10*ab*, 1-*ac*, . . . ), the electronic blackboard 20*a*, and the router 70*a* are connected to a LAN 2*a* to be capable of communicating with each other. The call terminals (10*ba*, 10*bb*, 10*bc*, . . . ), the electronic blackboard 20*b*, and the router 70*b* are connected to a LAN 2*b* to be capable of communicating with each other. Also, the LAN 2*a* and the LAN 2*b* are connected to be capable of communicating with each other, by a dedicated line 2*ab* including the router 70*ab*, and set up in a predetermined region A. For example, the region A is an office in Tokyo, the LAN 2*a* is set up in a first business department, and the LAN 2*b* is set up in a second business department.

On the other hand, the call terminals (10*ca*, 10*cb*, 10*cc*, . . . ), the electronic blackboard 20*c*, and the router 70*c* are connected to a LAN 2*c* to be capable of communicating with each other. The call terminals (10*da*, 10*db*, 10*dc*, . . . ), the electronic blackboard 20*d*, and the router 70*d* are connected to a LAN 2*d* to be capable of communicating with each other. Also, the LAN 2*c* and the LAN 2*d* are connected to be capable of communicating with each other, by a dedicated line 2*cd* including the router 70*cd*, and set up in a predetermined region B. For example, the region B is an office in Osaka, the LAN 2*c* is set up in a first development department, and the LAN 2*d* is set up in a second development department. The region A and the region B are connected to the Internet 2*i* to be capable of communicating with each other via the respective routers (70*ab*, 70*cd*).

Also, the transmission control system 50, the program providing system 90, and the maintenance system 100 are connected with the call terminals 10 and the electronic blackboards 20 via the Internet 2*i* to be capable of communicating with each other. The transmission control system 50, the program providing system 90, and the maintenance system 100 may be set up in the region A or the region B, or may be set up in a region other than these.

Note that in the embodiment, the LAN 2*a*, LAN 2*b*, dedicated line 2*ab*, Internet 2*i*, dedicated line 2*cd*, LAN 2*c*, and LAN 2*d* constitute the communication network 2 of the embodiment. This communication network 2 may include not only a part connected by wire, but also a part connected by wireless communication such as WiFi (Wireless Fidelity) and Bluetooth (trademark).

Also, in FIG. 1, sets of four numerals attached below the call terminals 10, the electronic blackboards 20, the transmission control system 50, the routers 70, the program providing system 90, and the maintenance system 100 represent respective IP addresses in the IPv4 format in a simplified manner. For example, the IP address of the call terminal 10*aa* is 1. 2. 1. 3. Also, although IPv6 may be used instead of IPv4, IPv4 is used to simplify the description.

Note that the call terminals 10 and the electronic blackboards 20 may be used not only for communication between multiple offices, or communication between different rooms in the same office, but also for communication in the same room, or communication between the outdoors and indoors, or between the outdoors. If the call terminal 10 is used outdoors, communication may be executed wirelessly by a cellular phone communication network or the like.

<<Hardware Configuration of Embodiment>>

Figure 4:
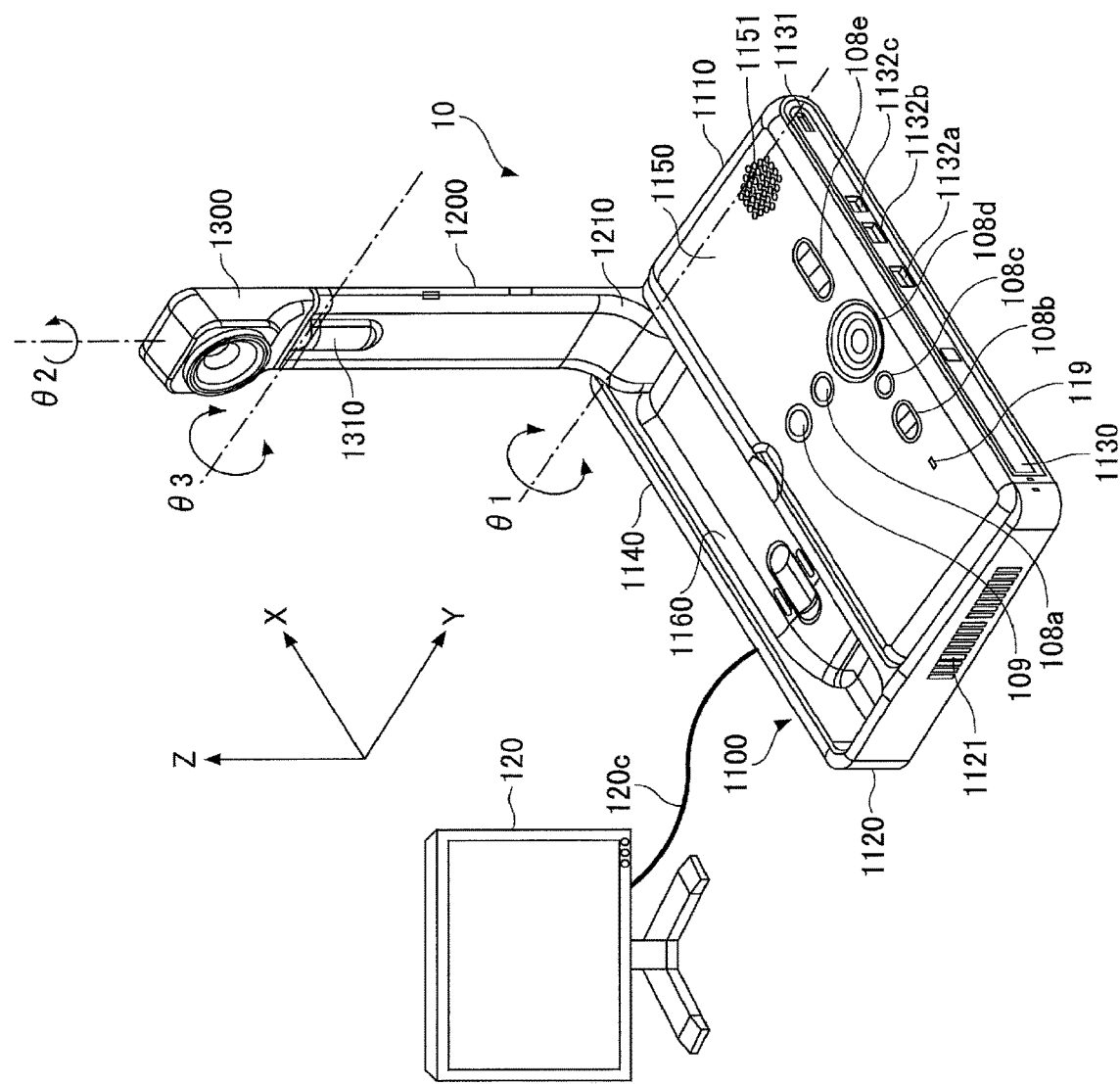
FIG. 4 is an external view of a call terminal.

Next, a hardware configuration of the embodiment will be described using FIG. 4 to FIG. 8. FIG. 4 is an external view of the call terminal 10. It is assumed in the following description that X-axis is the longitudinal direction of the call terminal 10, Y-axis is the direction perpendicular to the X-axis on the horizontal plane, and Z-axis is the direction perpendicular to the X-axis and Y-axis (the vertical direction).

As illustrated in FIG. 4, the call terminal 10 includes a chassis 1100, an arm 1200, and a camera housing 1300. Among these, a front side surface 1110 of the chassis 1100 has multiple air intake holes (not shown), and a rear side surface 1120 of the chassis 1100 has multiple air outlet holes 1121. With these holes, outside air can be taken in by driving a cooling fan built in the chassis 1100, through the air intake holes (not shown), then exhausted through the air outlet holes 1121. A right side surface 1130 of the chassis 1100 has a sound pickup hole 1131, through which voices, sounds, noises, and the like are captured by a built-in microphone 114, which will be described later.

The chassis 1100 has an operation panel 1150 formed on the side closer to the right wall 1130. The operation panel 1150 has multiple operation buttons 108*a*-108*e*, a power switch 109, an alarm lamp 119, and a sound output hole 1151 through which sounds output from a built-in loudspeaker 115 reaches outside. These parts will be described later. On a left side surface 1140 of the chassis 1100, a concave shaped housing part 1160 is provided to hold the arm 1200 and the camera housing 1300. The right side surface 1130 of the chassis 1100 also has multiple connectors 1132a-1132c to electrically connect cables to an external device connection interface 118, which will be described later. On the other hand, the left side surface 1140 of the chassis 1100 has a connector (not shown) to electrically connect a cable 120c for a display 120 to the external device connection interface 118.

Note that in the following description, an "operation button 108" will be used when designating an arbitrary one of the operation buttons 108a-108b, and a "connector 1132" will be used when designating an arbitrary one of the connectors 1132a-1132c.

The arm 1200 is attached to the chassis 1100 via a torque hinge 1210, and is configured to be capable of rotating vertically up to 135 degrees of tilt angle θ1 relative to the chassis 1100. In FIG. 4, the tilt angle θ1 is set to 90 degrees.

The camera housing 1300 has a built-in camera 112 to take an image of a user, a document, or a room, which will be described later. The camera housing 1300 also has a torque hinge 1310. The camera housing 1300 is attached to the arm 1200 via the torque hinge 1310. Further, the camera housing 1300 is attached to the arm 1200 via the torque hinge 1310, and is configured to be capable of rotating vertically up to ±180 degrees of pan angle θ2, or horizontally up to ±45 degrees of tilt angle θ3, relative to zero degree corresponding to the angles with respect to the arm 1200 in FIG. 4.

Figure 5:
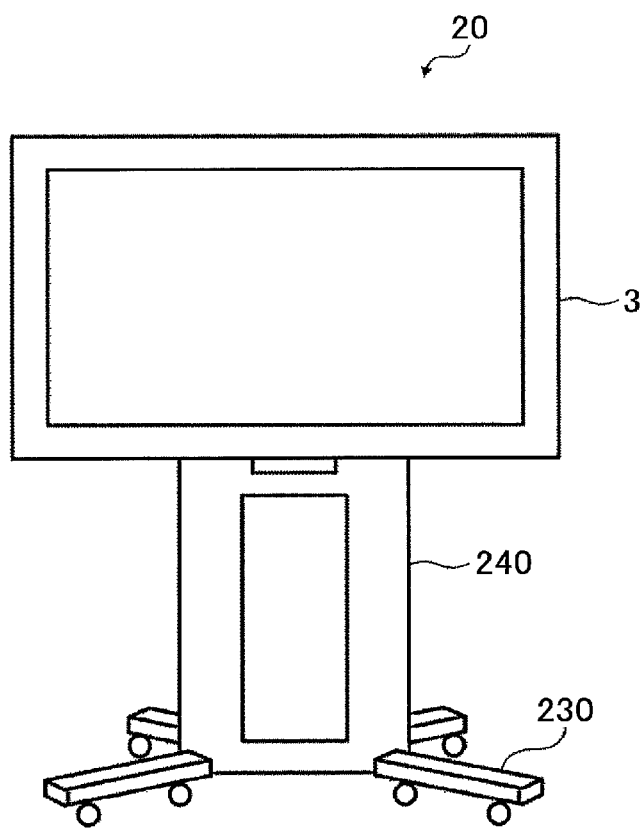
FIG. 5 is an external view of an electronic blackboard.

Also, FIG. 5 is an external view of the electronic blackboard 20. As illustrated in FIG. 5 the electronic blackboard 20 is constituted with a leg portion 230 having multiple casters disposed on the lower side, a pillar 240 disposed on the upper side of the leg portion 230, and the display 3 that also serves as the main body of the electronic blackboard, disposed on the upper side of the pillar 240. Further, the display 3 that also serves as the main body of the electronic blackboard has a CPU 201 built in, which will be described later.

Note that the external views illustrated in FIG. 4 and FIG. 5 are just examples; the call terminal 10 and the electronic blackboard 20 may have other appearances, respectively. The transmission control system 50, the program providing system 90, and the maintenance system 100 have the same appearance as a general server or a computer, and description of the appearance is omitted.

Figure 6:
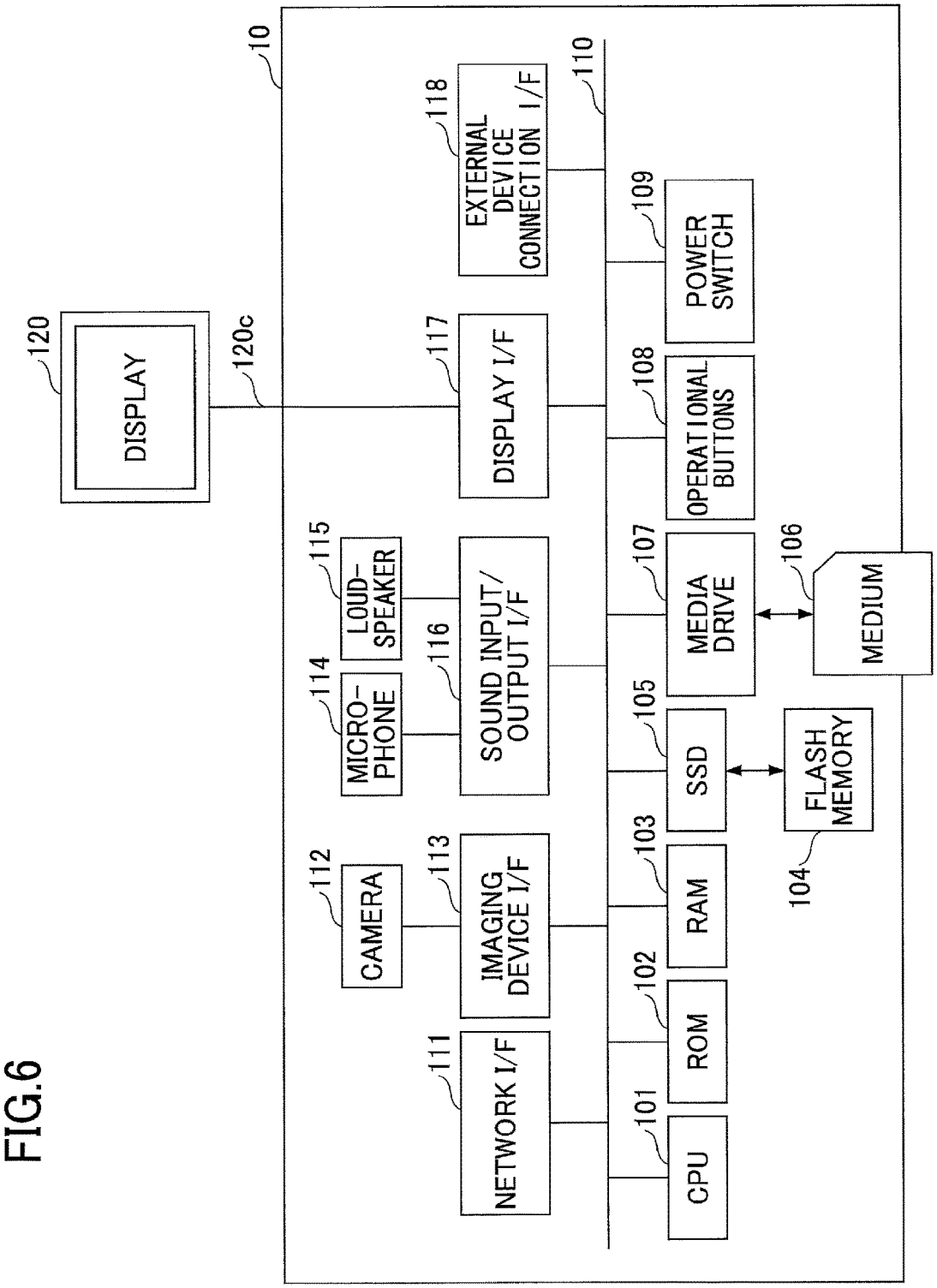
FIG. 6 is a hardware configuration diagram of a call terminal.

FIG. 6 is a hardware configuration diagram of the call terminal 10. As illustrated in FIG. 6, the terminal 10 in the embodiment includes a CPU (Central Processing Unit) 101 to control the overall operations of the call terminal 10; a ROM (Read Only Memory) 102 to store programs to drive the CPU 101 such as an IPL (Initial Program Loader); a RAM (Random Access Memory) 103 used as a work area for the CPU 101; a flash memory 104 to store a program for the call terminal and various data items such as image data and audio data; an SSD (Solid State Drive) 105 to control writes/reads of various data items on the flash memory 104 under control of the CPU 101; a media drive 107 to control writes/reads of the data on a recording medium 106 such as a flash memory; operational buttons 108 operated when selecting a destination of the call terminal 10 and the like; the power switch 109 to switch the power of the call terminal 10 on and off; and a network I/F (interface) 111 to transmit data using the communication network 2.

The call terminal 10 also includes the built-in camera 112 to obtain image data by capturing an image of an object under control of the CPU 101; an imaging device I/F 113 to control driving the camera 112; the built-in microphone 114 to input sound; the built-in loudspeaker 115 to output sound; a sound input/output I/F 116 to input/output audio signals with the microphone 114 and the loudspeaker 115 under control of the CPU 101; a display I/F 117 to transfer image data to the external display 120 under control of the CPU 101; the external device connection I/F 118 to connect various external devices at connectors (not illustrated) in FIG. 4; the alarm lamp 119 to indicate faults of various functions in the call terminal 10; and a bus line 110 including an address bus, a data bus, and the like to electrically connect the above elements as illustrated in FIG. 6.

The display 120 is a unit for displaying image data of an object, operational icons, and the like, constituted with a liquid crystal display or an organic electroluminescence display. The display 120 is connected to the display I/F 117 by the cable 120c. The cable 120c may be a cable for analog RGB (VGA) signals, may be a cable for component video, or may be a cable for HDMI (trademark) (High-Definition Multimedia Interface) or DVI (Digital Video Interactive). The camera 112 includes a solid-state imaging device to convert light into electric charges to electronize an image of an object, in which a CMOS (Complementary Metal Oxide Semiconductor) or CCD (Charge Coupled Device) may be used as the solid-state imaging device.

The external device connection I/F 118 may be connected with an external camera, an external microphone, an external loudspeaker, or the like, with a USB (Universal Serial Bus) cable or the like. If an external camera is connected, the external camera is driven under control of the CPU 101, with priority over the built-in camera 112. Similarly, if an external microphone is connected, or if an external loudspeaker is connected, the external microphone or the external loudspeaker is driven under control of the CPU 101, with priority over the built-in microphone 114 or the built-in loudspeaker 115, respectively.

Note that the camera 112, the microphone 114, and the loudspeaker 115 are not necessarily built in, but a configuration may be considered in which only an external camera, an external microphone, and an external loudspeaker can be connected. Also, the display 120 may be built in the call terminal 10, or instead of the display 120, a projection device such as a projector may be used. Also, the recording medium 106 is configured to be easily attached to or detached from the call terminal 10. Also, instead of the flash memory 104, an EEPROM (Electrically Erasable and Programmable ROM) or the like may be used, as long as the element is a memory on which reads/writes of data can be executed under control of the CPU 101.

Next, using FIG. 7, a hardware configuration of the electronic blackboard in the embodiment will be described. Note that FIG. 7 is a hardware configuration diagram of the electronic blackboard 20.

Figure 7:
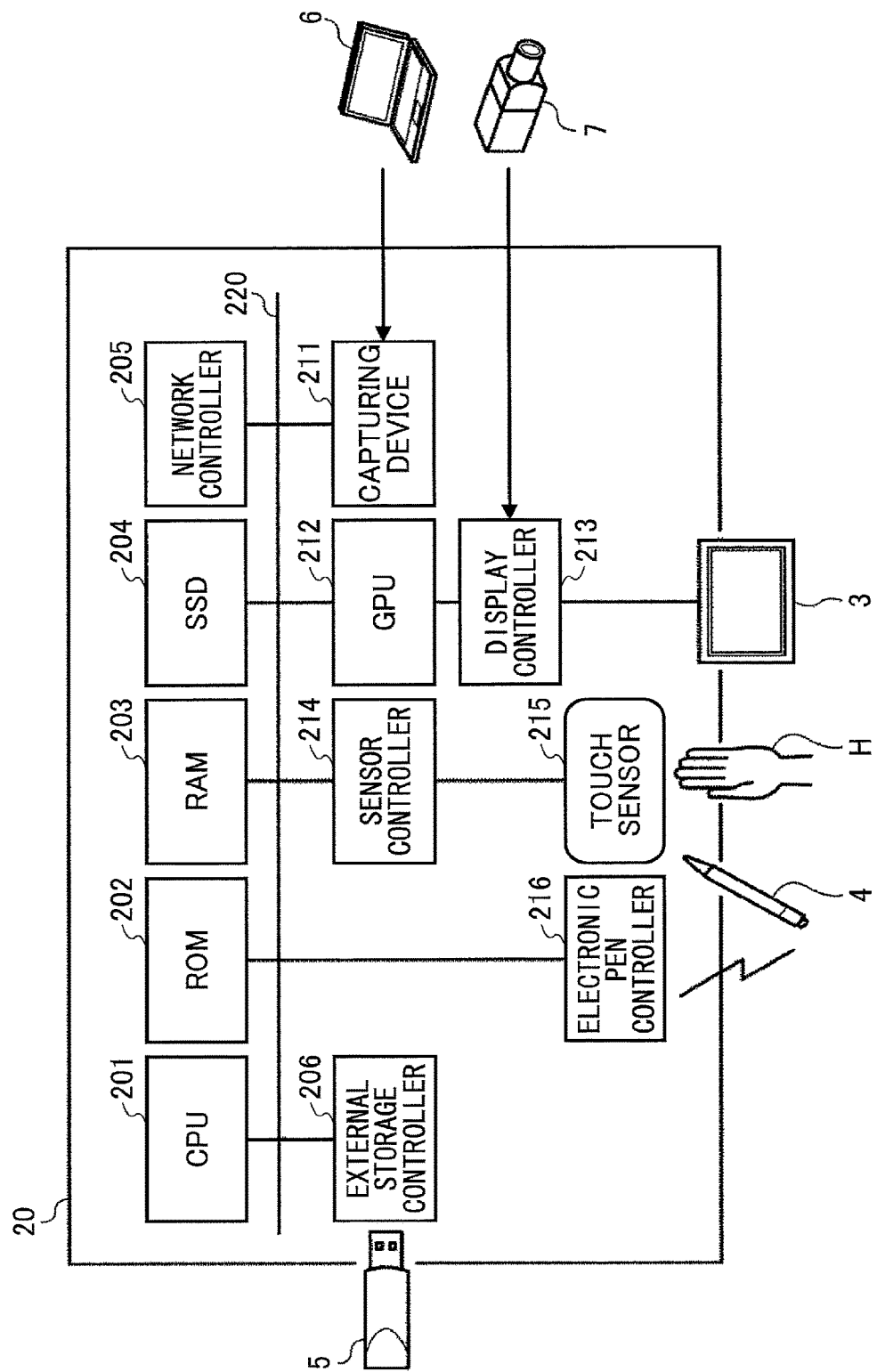
FIG. 7 is a hardware configuration diagram of an electronic blackboard.

As illustrated in FIG. 7, the electronic blackboard 20 includes a CPU 201 to control the overall operations of the electronic blackboard 20; a ROM 202 to store programs to be used for driving the CPU 201, such as an IPL; a RAM 203 used as a work area for the CPU 201; an SSD 204 to store various data items of a program for the electronic blackboard 20; a network controller 205 to control communication with the communication network 2; and an external memory controller 206 to control communication with a USB memory 5.

The electronic blackboard 20 also includes a capturing device 211 to capture a still picture or a moving picture that is displayed on a display of a note PC 6; a GPU (Graphics Processing Unit) 112 dedicated to processing graphics; and a display controller 213 to control and manage a screen display to output an image output from the GPU 112.

Further, the electronic blackboard 20 includes a sensor controller 214 to control a process of a touch sensor 215; and the touch sensor 215 to detect a contact by the electronic pen 4 or the user's hand H on the display 3. This touch sensor 215 receives coordinates as input by an infrared cut-off method, and detects the coordinates. This method of inputting coordinates and detecting coordinates is a method in which two light reception/emission devices (not illustrated) disposed at both ends on the upper side of the display 3, emit multiple infrared rays parallel to the display 3, and receive the light that is reflected by a reflecting member disposed around the display 3, and comes back through the same light path as the light emitted by light reception elements has gone through. The touch sensor 215 outputs IDs (Identifications) of the infrared rays that have been emitted by the two light reception/emission devices, and cut off by an object, to the sensor controller 214, and the sensor controller 214 identifies a coordinate position which is a contact position of the object. Note that all IDs described in the following are examples of identification information.

The touch sensor 215 is not limited to an infrared cut-off method, but various detection units may be used including a touch panel of an electrostatic capacitance type that identifies a contact position by detecting a change of the electrostatic capacitance; a touch panel of a resistance film method to identify a contact position by a voltage change of two resistor films facing each other; and a touch panel of an electromagnetic induction type to identify a contact position by detecting electromagnetic induction generated by a contact object contacting the display part.

The electronic blackboard 20 also includes an electronic pen controller 216. This electronic pen controller 216 communicates with the electronic pen 4, to determine whether there is a touch by the pen point or a touch by the pen tail on the display 3. Note that the electronic pen controller 216 may determine whether there is a touch not only by the pen point or the pen tail, but also by a part of the electronic pen 4 gripped by the user, or another part of the electronic pen.

The electronic blackboard 20 further includes a bus line 220 including an address bus, a data bus, and the like to electrically connect the CPU 201, the ROM 202, the RAM 203, the SSD 204, the network controller 205, the external memory controller 206, the capturing device 211, the GPU 212, the sensor controller 214, and the electronic pen controller 216 as illustrated in FIG. 2.

Figure 8:
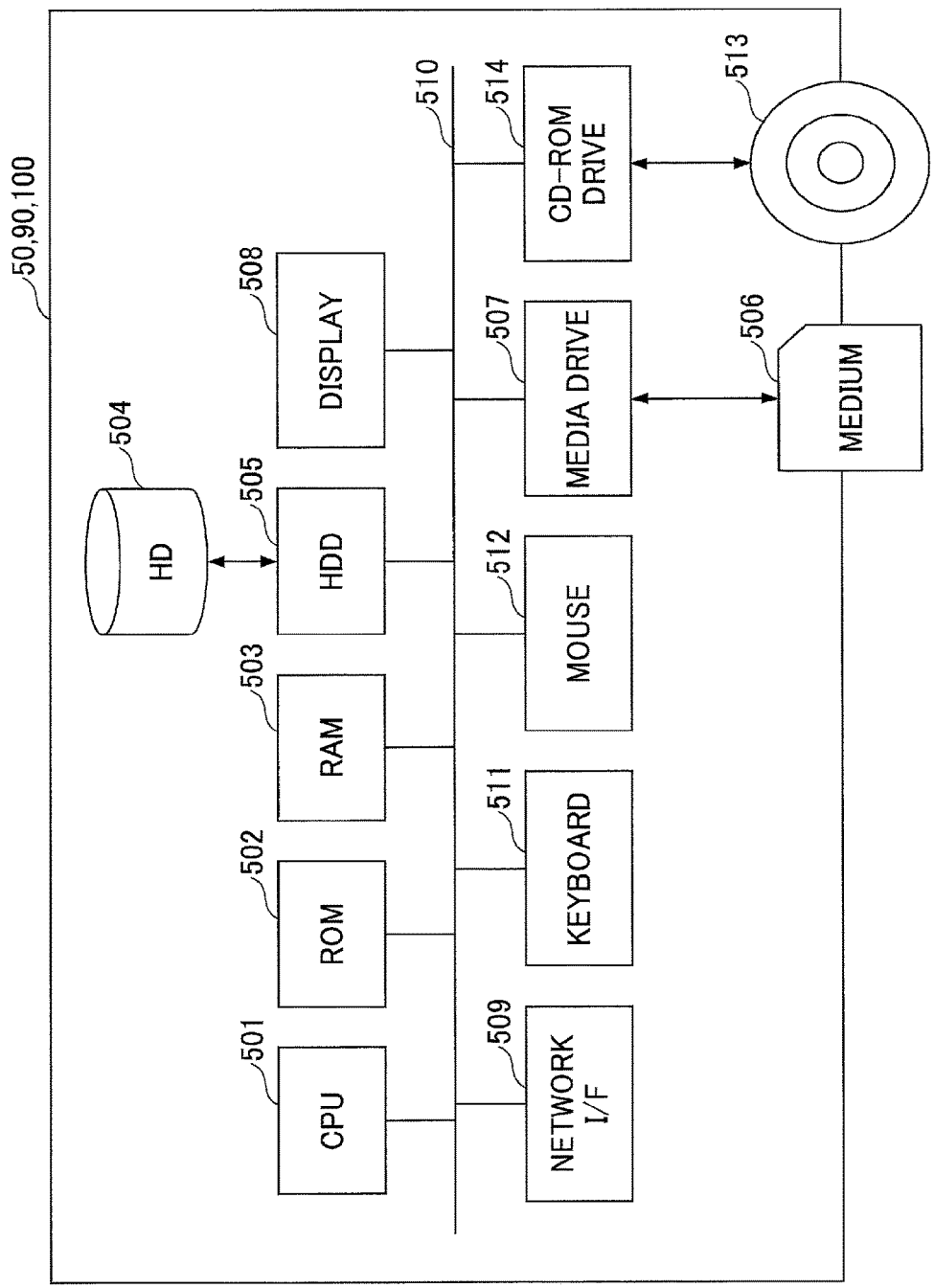
FIG. 8 is a hardware configuration diagram of a transmission control system, a program providing system, and a maintenance system.

Next, a hardware configuration of the transmission control system 50, the program providing system 90, and the maintenance system 100 will be described using FIG. 8 according to the embodiment. FIG. 8 is a hardware configuration diagram of the transmission control system 50, the program providing system 90, and the maintenance system 100. Note that in the following, as a representative case, a hardware configuration of the transmission control system 50 will be described.

The transmission control system 50 includes a CPU 501 to control the overall operations of the transmission control system 50; a ROM 502 that stores a program to be used for driving the CPU 501, such as an IPL; a RAM 503 used as a work area for the CPU 501; an HD 504 to store various data items of a program for transmission control; a HDD (Hard Disk Drive) 505 to write/read various data items on the HD 504 under control of the CPU 501; a media drive 507 to control writes/reads of data on a recording medium 506 such as a flash memory; a display 508 to display various information items such as cursors, menus, windows, characters, and images; a network I/F 509 to transmit data by using the communication network 2; a keyboard 511 providing multiple keys to enter characters, numerals, various commands, etc.; a mouse 512 for various selections and executions, selection of an object, and moving the cursor; a CD-ROM drive 514 to control writes/reads of various data items on a CD-ROM (Compact Disc Read Only Memory) 513, which is an example of a recording medium attached/detached easily; and a bus line 510 including an address bus, a data bus, and the like to electrically connect the above elements.

<<Functional Configuration of Embodiment>>

Next, functional configurations will be described especially for the call terminal 10, the electronic blackboard 20, and the transmission control system 50 using FIG. 9 to FIG. 21.

<Functional Configuration of Call Terminal>

Figure 9:
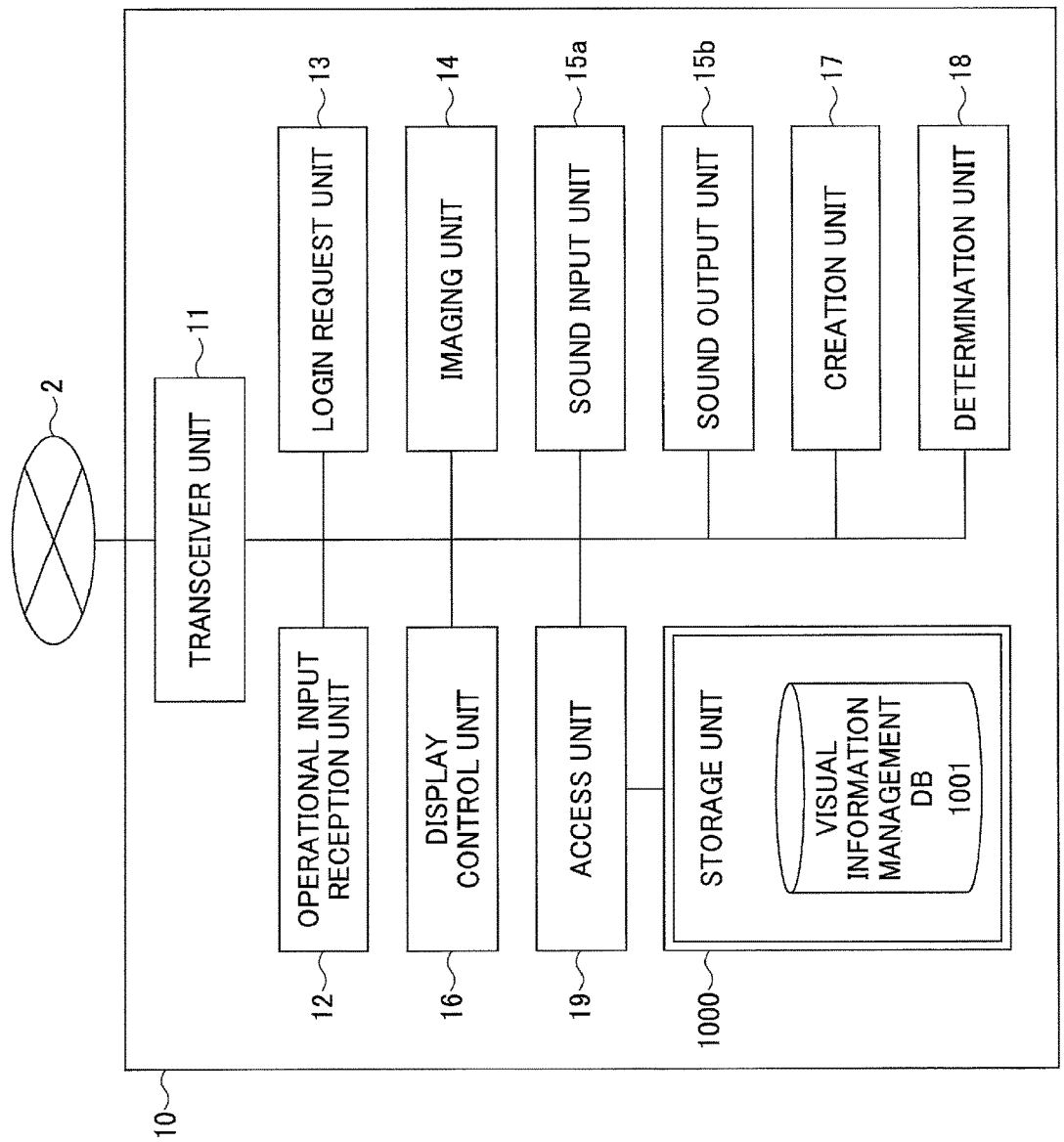
FIG. 9 is a functional block diagram of a call terminal.

First, a functional configuration of the call terminal 10 will be described using FIG. 9. FIG. 9 is a functional block diagram of the call terminal 10.

The call terminal 10 has units (functions) including a transceiver unit 11, an operational input reception unit 12, a login request unit 13, an imaging unit 14, a sound input unit 15a, a sound output unit 15b, a display control unit 16, a creation unit 17, a determination unit 18, and an access unit 19, which are implemented by the hardware configuration illustrated in FIG. 6 and execution of a program.

Also, the call terminal 10 also includes a storage unit 1000 constituted with the flash memory 104 illustrated in FIG. 6. This storage unit 1000 stores destination list frame data that represents a frame part (a part other than a selection area, which will be described later) of a destination list screen, which will be described later, illustrated in FIG. 24. The storage unit 1000 also stores a terminal ID, a password, and the like to identify the call terminal 10 itself. In this storage unit 1000, image data and sound data received while making a call with a destination terminal are overwritten and stored upon each reception. Among these, an image is displayed on the display 120 by image data yet to be overwritten, and a sound is output from the loudspeaker 115 by sound data yet to be overwritten. Further, the storage unit 1000 includes a visual information management DB (Database) 1001 constituted with a visual information management table.

(Visual Information Management Table)

FIG. 10 is a diagram illustrating a visual information management table. In the visual information management table, operational state information that represents an operational state of each destination candidate, is associated with visual information represented in a destination list displayed on the display 120, to be managed. Note that among destination candidates, a transmission terminal that has actually come to execute communication is the destination terminal described above. Also, the visual information is represented by, for example, various icons having shapes illustrated in FIG. 10. The visual information items that constitute the visual information management table may be transmitted from the transmission control system 50 when a starter terminal makes a request for login at Step S42, which will be described later, or may be stored in the storage unit 1000 before factory shipment of the starter terminal. For example, the operational state takes one of four types of states, online (ready to communicate), online (communicating), online (suspended), and offline.

(Functional Configuration of Call Terminal)

Referring back to FIG. 9, the transceiver unit 11 transmits and receives various data items (or information items) with other terminals, devices, and systems, via the communication network 2.

The operational input reception unit 12 receives various input items or various selections by the user. For example, if the user turns on the power switch 109 illustrated in FIG. 6, the operational input reception unit 12 illustrated in FIG. 9 receives the power-on operation, and turns on the power source. Also, the operational input reception unit 12 receives input of text data from the user of the call terminal 10.

Upon the reception of the above power-on operation, the login request unit 13 transmits a request for login to request authentication of a login and a request for starting communication from the transceiver unit 11 to the transmission control system 50 via the communication network 2.

The imaging unit 14 captures an image of an object, and outputs the obtained image data.

After sound of the user has been converted to a sound signal by the microphone 114, the sound input unit 15a inputs sound data relating to this sound signal. The sound output unit 15b output a sound signal relating to sound data to the loudspeaker, to have the sound output from the loudspeaker 115.

The display control unit 16 controls image data or the like to be output and displayed on the external display 120, or not to be output and displayed.

The creation unit 17 creates and updates a destination list screen illustrated in FIG. 24, based on the destination list frame data read out of the storage unit 1000, and destination list content information, which will be described later.

The determination unit 18 periodically determines whether the call terminal 10 operates normally.

Also, the access unit 19 executes a process for storing various data items in the storage unit 1000, or reading various data items stored in the storage unit 1000.

Note that each ID in the embodiment is identification information to uniquely identify a transmission terminal (the call terminal 10 or the electronic blackboard 20), which is represented by languages, characters, symbols, various marks, and the like. Also, the ID may be identification information that is represented by a combination of at least two of the languages, characters, symbols, and various marks.

<Functional Configuration of Electronic Blackboard>

Figure 11:
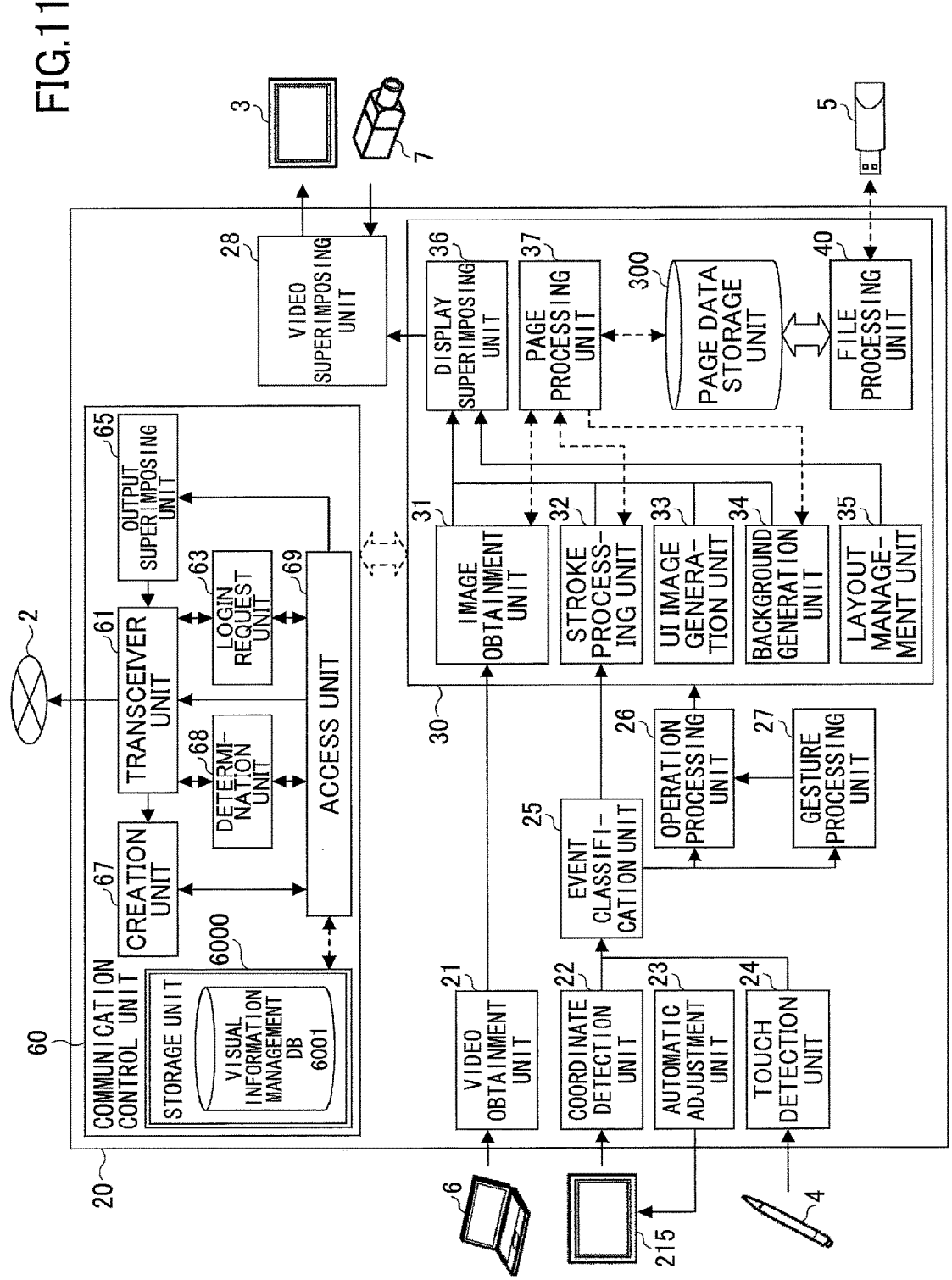
FIG. 11 is a functional block diagram of an electronic blackboard.

Next, a functional configuration of the electronic blackboard 20 will be described using FIG. 11 to FIG. 16. FIG. 11 is a functional block diagram of the electronic blackboard 20.

The electronic blackboard 20 has units (functions) including a video obtainment unit 21, a coordinate detection unit 22, an automatic adjustment unit 23, a touch detection unit 24, an event classification unit 25, an operation processing unit 26, a gesture processing unit 27, a video superimposing unit 28, an image processing unit 30, and a communication control unit 60, which are implemented by the hardware configuration illustrated in FIG. 7 and execution of a program.

Among these, the video obtainment unit 21 obtains an output video of a video output device such as the note PC 6 connected by a cable. In response to receiving an image signal from the video output device, the video obtainment unit 21 analyzes this image signal to derive the resolution of an image frame, which is a display image formed by the video output device with this image signal, and image information about the update frequency of this image frame, and outputs the derived information to the image obtainment unit 31, which will be described later.

The coordinate detection unit 22 detects the coordinate position of an event generated by a user on the display 3 (a touch operation by the user's hand H on the display 3 or the like). Also, the coordinate detection unit 22 detects the area of a touched part.

The automatic adjustment unit 23 is activated when the electronic blackboard 20 is activated, to adjust image processing parameters of a sensor camera of the touch sensor 215 of an optical sensor type so that the touch sensor 215 can output an appropriate value to the coordinate detection unit 22.

The touch detection unit 24 detects an event generated by the user, such as a pressing (touching) operation on the display 3 by the pen point of the electronic pen 4 or the pen tail of the electronic pen 4.

The event classification unit 25 classifies the coordinates position of an event detected by the coordinate detection unit 22, and a detection result detected by the touch detection unit 24, into one of events among a stroke drawing, a UI operation, and a gesture operation. Here, the stroke drawing, the UI operation, and the gesture operation will be described using FIG. 12. Note that FIG. 12 is a configuration diagram of image layers.

Figure 12:
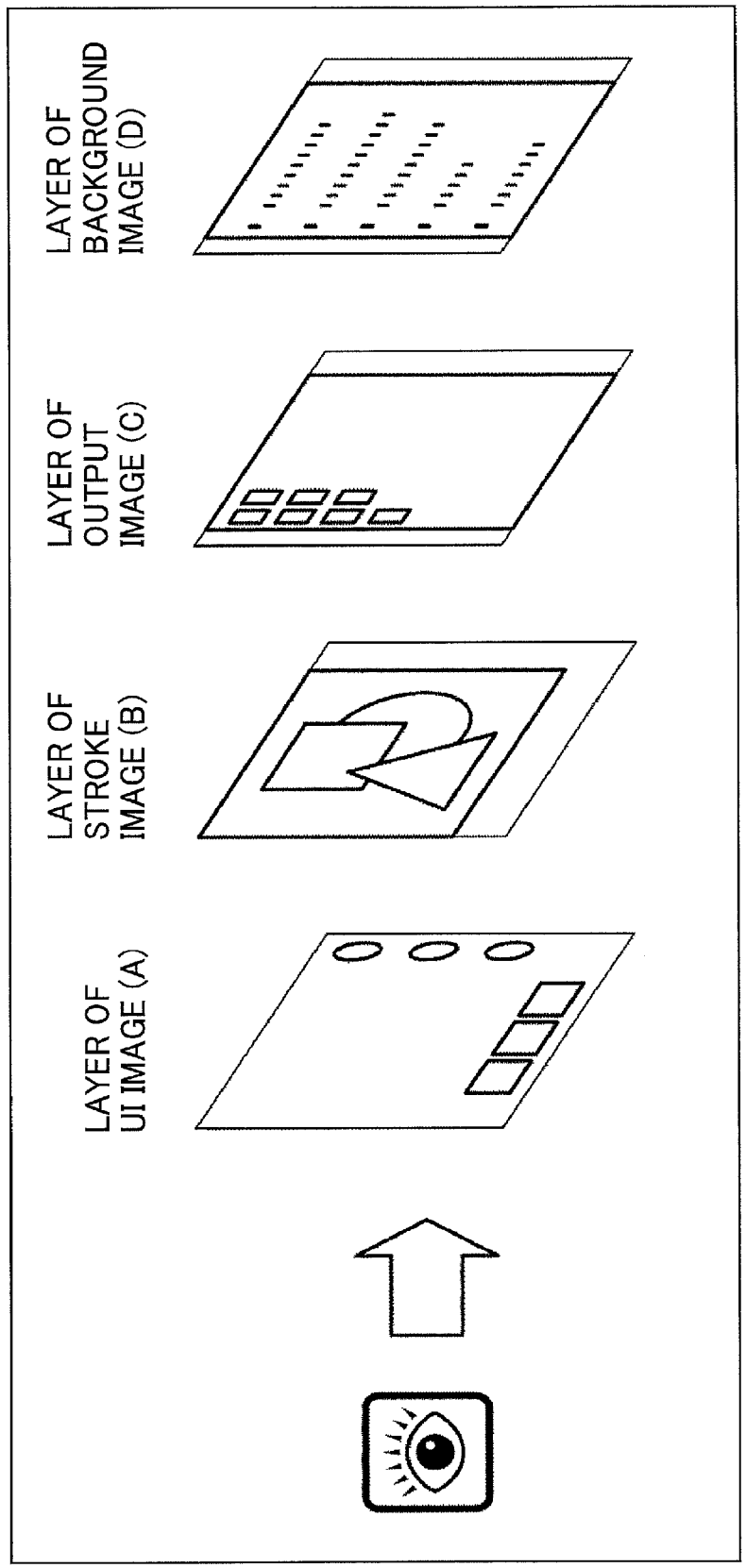
FIG. 12 is a configuration diagram of image layers.

First, the "stroke drawing" is an event generated when a stroke image (B), which will be described later, illustrated in FIG. 12, is displayed on the display 3 by the user who presses the electronic pen 4 on the display 3, moves the electronic pen 4 while keeping the pressing state, and eventually detaches the electronic pen 4 from the display 3. By this stroke drawing, for example, a letter of the alphabet such as "S" or "T" is drawn on the display 3. Note that this "stroke drawing" includes not only drawing an image, but also an event of deleting an image that has been drawn already, and editing an image that has been drawn.

The "UI operation" is an event generated when a UI image (A), which will be described later, illustrated in FIG. 12, is displayed on the display 3 by the user who presses a predetermined position by the electronic pen 4 or the hand H. By this UI operation, for example, the color and the width of a line drawn by the electronic pen 4 are set.

The "gesture operation" is an event generated when a stroke image (B), which will be described later, illustrated in FIG. 12, is displayed on the display 3 by the user who touches the display 3 by the hand H, or moves the hand H on the display 3. By this gesture operation, for example, the user can enlarge (or reduce) an image, change a display area, or switch a page, by moving the hand H in a state where the hand H is kept touching on the display 3.

Next, referring back to FIG. 11, for a UI operation determined by the event classification unit 25, the operation processing unit 26 executes various operations following elements of the UI generated with the event. The elements of a UI may include, for example, a button, a list, a check box, and a text box.

The gesture processing unit 27 executes an operation that corresponds to a gesture operation determined by the event classification unit 25.

The video superimposing unit 28 displays a video having an image superimposed by the display superimposing unit 36, which will be described later, on a video output device (the display 3 or the like). Also, the video superimposing unit 28 displays a video transmitted from a video output device (the camera 7 or the like), on a video from another video output device (the note PC 6 or the like) by picture-in-picture. Further, the video superimposing unit 28 executes switching for a video displayed on a part of the display 3 by picture-in-picture, to be displayed on the entire screen of the display 3.

(Functional Configuration of Image Processing Unit)

Next, a functional configuration of the image processing unit 30 will be described in detail. The image processing unit 30 executes a process for superimposing image layers illustrated in FIG. 12.

Therefore, the image processing unit 30 includes an image obtainment unit 31, a stroke processing unit 32, a UI image generation unit 33, a background generation unit 34, a layout management unit 35, a display superimposing unit 36, a page processing unit 37, a file processing unit 40, and a page data storage unit 300.

Among these, the image obtainment unit 31 obtains, as images, frames in a video obtained by the video obtainment unit 21. Such an image corresponds to an output image (C) illustrated in FIG. 12.

The stroke processing unit 32 draws an image, deletes a drawn image, or edits a drawn image, based on an event relating to a stroke drawing classified by the event classification unit 25. Such an image by a stroke drawing corresponds to a stroke image (B) illustrated in FIG. 12.

The UI image generation unit 33 generates a UI (user interface) image set in the electronic blackboard 20 in advance. Such a UI image corresponds to a UI image (A) illustrated in FIG. 12.

The background generation unit 34 generates a background image to be displayed on the display 3. Such a background image corresponds to a background image (D) illustrated in FIG. 12. The pattern of a background image may be solid color, grid display, or the like.

The layout management unit 35 manages layout information that represents a layout of images output from the image obtainment unit 31, the stroke processing unit 32, the UI image generation unit 33, and the background generation unit 34, respectively, for the display superimposing unit 36. This makes it possible for the layout management unit 35 to issue a command to the display superimposing unit 36 about whether to display an output image (C) and a stroke image (B) or not to display, and if to display, positions in an UI image (A) and a background image (D).

The display superimposing unit 36 superimposes the output image (C) from the image obtainment unit 31, the stroke image (B) from the stroke processing unit 32, the UI image (A) from the UI image generation unit 33, and the background image (D) from the background generation unit 34, following the layout specified by the layout management unit 35. Thus, as illustrated in FIG. 12, the layers are in the sequence of the UI image (A), the stroke image (B), the output image (C), and the background image (D), and the user can see the superimposed images by this sequence.

Also, the display superimposing unit 36 can switch the superimposing for the image (C) and the image (D) illustrated in FIG. 12, respectively, so that one of the images (C) and (D) is exclusively superimposed on the image (A) and the image (B). For example, in a state where the image (A), the image (B), and the image (C) are displayed at first, if a cable between the electronic blackboard 20 and a video output device (the note PC 6 or the like) is pulled out, the layout management unit 35 may specify the image (C) as not to be superimposed, and to display the image (D). In this case, the display superimposing unit 36 may execute processes for enlarging the display, reducing the display, and moving the display area.

The page processing unit 37 aggregates data of the stroke image (B) and data of the output image (C) into single page data, and stores the single page data in the page data storage unit 300. Also, the page processing unit 37 transmits the page data stored in the page data storage unit 300 to the display superimposing unit 36 via the image obtainment unit 31 so that the video superimposing unit 28 can redisplay the page data on the display 3. Further, the page processing unit 37 transmits the page data stored in the page data storage unit 300 to the communication control unit 60 via the image obtainment unit 31 so that the communication control unit 60 can transmit the page data (stroke array data and media data) to another electronic blackboard 20 or a call terminal 10. Also, the page processing unit 37 transmits the page data to the stroke processing unit 32, to transition to a state in which the stroke can be re-edited. Further, the page processing unit 37 can delete or copy the page data.

Also, when reading the page data from the page data storage unit 300, the page processing unit 37 separates the single page data into stroke array data that represents the stroke image (B), and media data that represents the background image (D). In other words, data of the output image (C) displayed on the display 3 at the moment when the page processing unit 37 stores the data in the page data storage unit 300, is first stored in the page data storage unit 300, and then, read out as media data that represents the background image (D) when read out from the page data storage unit 300. Then, among items of the page data read from the page data storage unit 300, the page processing unit 37 outputs the stroke array data that represents the stroke image (B) to the stroke processing unit 32. Also, among the items of the page data read from the page data storage unit 300, the page processing unit 37 outputs the media data that represents the background image (D) to the image obtainment unit 31.

The page data storage unit 300 stores page data as illustrated in FIG. 13. FIG. 13 is a schematic view illustrating the page data. The page data is data of one page to be displayed on the display 3 (stroke data and image data). Note that since the page data includes a lot of parameter types, here, contents of the page data are separated into FIG. 13 to FIG. 16 for the description.

Referring back to FIG. 11, if the electronic blackboard 20 has been terminated with an abnormal end, then, the file processing unit 40 detects the abnormal end, and recovers unsaved page data. For example, in case of a normal end, the file processing unit 40 obtains the page data from the page data storage unit 300, and records the page data as a PDF file in a USB 5. However, in case of an abnormal end due to the power down or the like, the page data may remain as recorded in the page data storage unit 300. Therefore, when the power is turned on again, the file processing unit 40 reads the page data from the page data storage unit 300 to recover the data. Also, the file processing unit 40 reads the PDF file from the USB memory 5, and stores each page as page data in the page data storage unit 300.

Here, the page data will be described in detail. As illustrated in FIG. 13, the page data includes the page data ID to identify a page; the start time that represents a time when displaying the page has been started; the finish time that represents a time when rewriting the content of the page by a stroke, a gesture, and the like has been finished; the stroke array data ID to identify stroke array data generated by strokes with the electronic pen 4 and the user's hand H; and the media data ID to identify media data, which are associated with each other. The stroke array data is data for displaying the stroke image (B) illustrated in FIG. 12 on the display 3. The media data is data for displaying the background image (D) illustrated in FIG. 12 on the display 3.

By the page data as such, for example, if the user draws a letter "S" of the alphabet by the electronic pen 4, the drawing is a one-stroke drawing, and hence, the single letter "S" of the alphabet is represented by a single stroke data ID. On the other hand, if the user draws a letter "T" of the alphabet by the electronic pen 4, the drawing is a two-stroke drawing, and hence, the single letter "T" of the alphabet is represented by two stroke data IDs.

Figure 14:
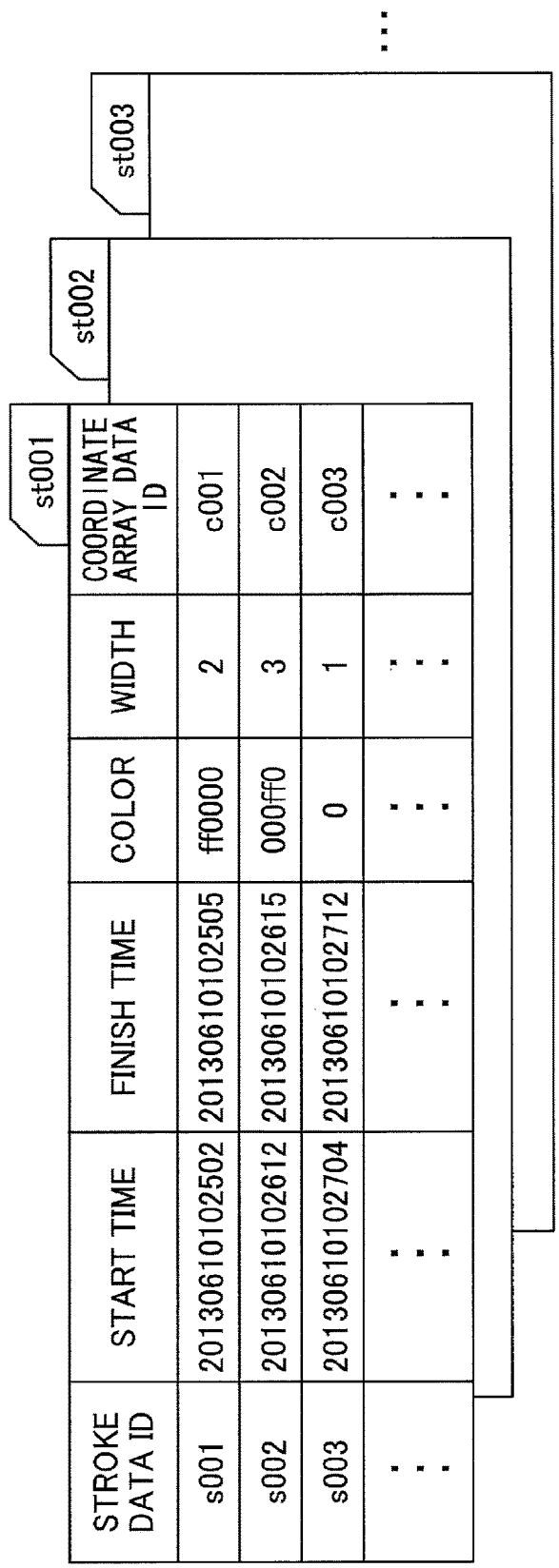
FIG. 14 is a schematic view illustrating stroke data.

The stroke array data also includes detailed information as illustrated in FIG. 14. FIG. 14 is a schematic view illustrating the stroke array data. As illustrated in FIG. 14, a chunk of stroke array data is represented by multiple records of stroke data. A record of stroke data includes the stroke data ID to identify the record of stroke data; the start time that represents a time when a corresponding stroke has been started to be written; the finish time that represents a time when the stroke writing has been completed; the stroke color; the stroke width; and the coordinate array data ID to identify an array of passing points of the stroke.

Figure 15:
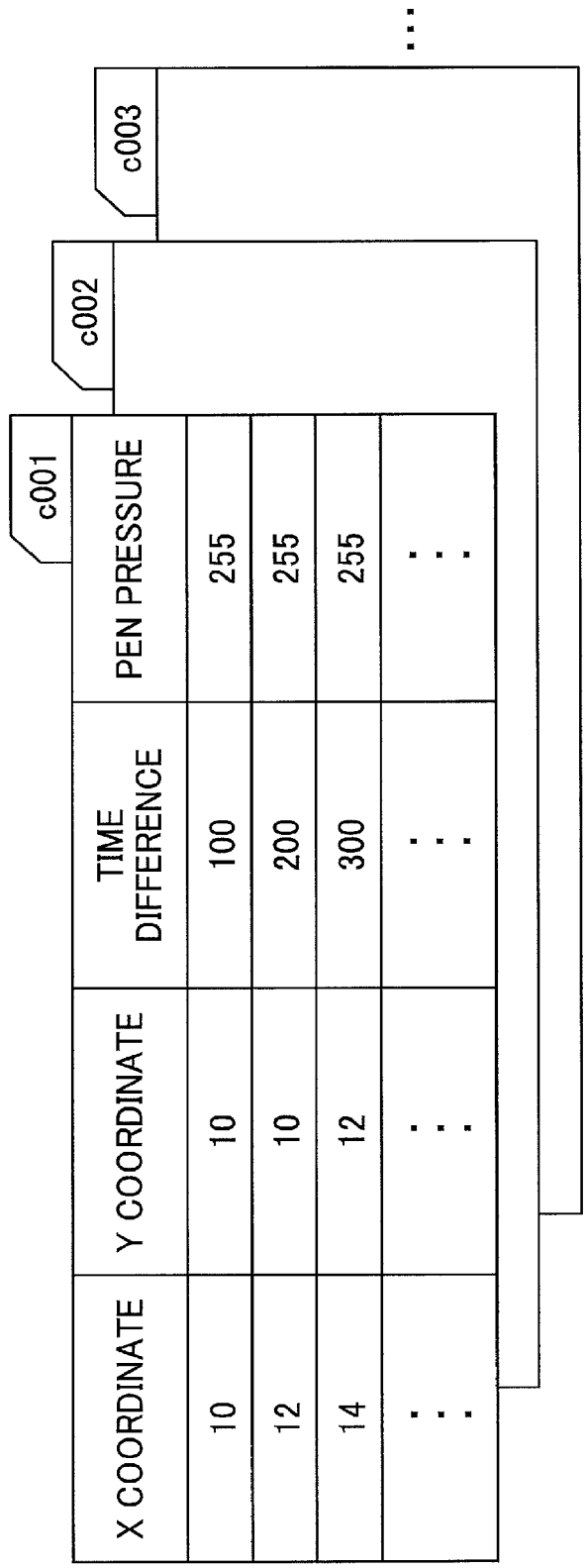
FIG. 15 is a schematic view illustrating coordinates array data.

Further, this coordinate array data ID includes detailed information as illustrated in FIG. 15. FIG. 15 is a schematic view illustrating the coordinate array data. As illustrated in FIG. 15, the coordinate array data includes information about, for each point of a stroke, (X coordinate value, Y coordinate value) of the point on the display 3, the time difference (ms) from the start time of the stroke when passing on this point, and the pen pressure of the electronic pen 4 at this point. In other words, a collection of points illustrated in FIG. 15 is represented by a record of coordinate array data illustrated in FIG. 14. For example, if the user draws a letter "S" of the alphabet by the electronic pen 4, the drawing is one-stroke drawing that passes through multiple passing points, and the information about these multiple passing points is represented by the coordinate array data.

Also, the media data among the items of the page data illustrated in FIG. 13 includes detailed information as illustrated in FIG. 16. FIG. 16 is a schematic view illustrating the media data. As illustrated in FIG. 16, the media data includes the media data ID in the page data illustrated in FIG. 13; the data type of the media data; the record of time when the page processing unit 37 has recorded the page data in the page data storage unit 300; the position (X coordinate value, Y coordinate value) and the size (width, height) of an image to be displayed on the display 3; and the data representing content of the media data, which are associated with each other. Among these, the position of an image to be displayed on the display 3 by the page data represents the position of the upper left end of the image displayed by the page data, relative to the coordinates of the upper left end of the display 3 represented by (X coordinate value, Y coordinate value)=(0, 0).

(Functional Configuration of Communication Control Unit)

Referring back to FIG. 11, next, a functional configuration of the communication control unit 60 will be described in detail. The communication control unit 60 controls the electronic blackboard 20 executing a process for communicating with an external device such as the call terminal 10, the other electronic blackboards 20, the transmission control system 50, the program providing system 90, and the maintenance system 100.

Therefore, the communication control unit 60 includes a transceiver unit 61, a login request unit 63, an output superimposing unit 65, a creation unit 67, a determination unit 68, and an access unit 69. The communication control unit 60 further includes a storage unit 6000 constituted with the SSD 204 illustrated in FIG. 7. The storage unit 6000 includes a visual information management DB (Database) 6001 constituted with a visual information management table.

Also, the communication control unit 60 includes a part of the functional configuration of the call terminal 10 illustrated in FIG. 9. Specifically, the transceiver unit 61, the login request unit 63, the creation unit 67, the determination unit 68, and the access unit 69 of the communication control unit 60 execute substantially the same processes as the transceiver unit 11, the login request unit 13, the creation unit 17, the determination unit 18, and the access unit 19 of the call terminal 10, respectively. Also, the storage unit 6000 of the communication control unit 60 plays substantially the same role as the storage unit 1000 of the call terminal 10. Therefore, the description of these units is omitted.

The output superimposing unit 65 superimposes image data with image data.

The determination unit 68 periodically determines whether the electronic blackboard 20 operates normally.

<Functional Configuration of Transmission Control System>

Next, using FIG. 17 to FIG. 21, a functional configuration of the transmission control system 50 will be described. The transmission control system 50 has units (functions) including a transceiver unit 51, an authentication unit 52, a creation unit 53, a determination unit 58, and an access unit 59, which are implemented by the hardware configuration illustrated in FIG. 8 and execution of the program for transmission control.

Also, the transmission control system 50 includes a storage unit 5000 constituted with the HD 504 illustrated in FIG. 8. This storage unit 5000 stores destination list frame data in a destination list screen illustrated in FIG. 24 (not including the destination list content information such as icons, "01aa", and "call terminal AA" illustrated in FIG. 24).

Note that to simplify the description in the following, the stroke array data will be referred to as "coordinates data", and the media data will be referred to as "image data". Further, the type information managed in the terminal management DB 5002 includes "image" representing that image data can be processed, and "coordinates" representing that coordinates data can be processed.

(Authentication Management Table)

The storage unit 5000 includes an authentication management DB 5001 constituted with an authentication management table as illustrated in FIG. 18. In this authentication management table, relevant information is managed in that for the terminal ID of every transmission terminal managed in the transmission control system 50 (the call terminals 10 and the electronic blackboards 20), a corresponding password is associated. For example, in the authentication management table illustrated in FIG. 18, the terminal 10aa has a terminal ID "01aa" associated with a password "aaaa".

(Terminal Management Table)

The storage unit 5000 also includes a terminal management DB 5002 constituted with a terminal management table illustrated in FIG. 19. In this terminal management table, relevant information is managed in that for the terminal ID of each transmission terminal (the call terminals 10 and the electronic blackboards 20), the terminal name of the transmission terminal, the IP address of the transmission terminal, operational state information that represents a current operational state of the transmission terminal, and type information that represents the type of data that can be processed by the transmission terminal are associated with the terminal ID. As examples of data that can be processed, image data, sound data, text data, and coordinates data may be considered. Also, as an example of content of processing, reproduction of data may be considered. By reproduction of image data, an image is displayed on the displays 3 and 120. By reproduction of sound data, sound is output from the loudspeaker 115. By reproduction of text data, content of text is displayed on the display 3. By reproduction of coordinates data, a stroke image is displayed on the display 3.

For example, in the terminal management table illustrated in FIG. 19, the call terminal 10aa having the terminal ID "01aa" has the terminal name "call terminal AA"; the IP address of this call terminal 10aa is "1.2.1.3"; this call terminal 10aa is in the operational state "online (ready to communicate)", and is capable of processing types of data "image", "sound", and "text".

Note that in the relevant information illustrated in FIG. 19, each terminal ID is associated with type information that represents types of data processible by the corresponding transmission terminal, but the association is not limited as such; each of the type information items may be associated with the terminal IDs. In this case, for example, the type information "image" is associated with terminal IDs "01aa", "01ab", and so on, and the type information "coordinates" is associated with terminal IDs "02aa", "02ba", and so on. However, in this case, a table different from the terminal management table illustrated in FIG. 19 may be provided to manage the terminal IDs having the type information associated.

(Destination List Management Table)

The storage unit 5000 further includes a destination list management DB 5003 constituted with a destination list management table illustrated in FIG. 20. In this destination list management table, relevant information is managed in that for the terminal ID of each starter terminal that requests to start communication in a video-conference or the like is associated with terminal IDs of destination candidates that are registered as candidates of destination terminals.

For example, in the destination list management table illustrated in FIG. 20, a record represents that destination candidates to which a starter terminal (a terminal 10aa) having the terminal ID "01aa" can request to start communication with the call terminal 10ab having the terminal ID "01ab", the electronic blackboard 20a having the terminal ID "02aa", and the others. Note that the terminal IDs of the destination candidates are updated by addition or deletion in response to a request for the addition or deletion to the transmission control system 50, coming from any starter terminal.

(Session Management Table)

The storage unit 5000 further includes a session management DB 5004 constituted with a session management table illustrated in FIG. 21. In this session management table, relevant information is managed in that each session ID to identify a session used for communication among multiple transmission terminals (the call terminals 10 and the electronic blackboards 20) is associated with terminal IDs of transmission terminals that are using the session identified by this session ID. For example, in the session management table illustrated in FIG. 21, a record represents that transmission terminals using a session executed by using a session ID "se1" are the call terminal 10ab having the terminal ID "01ab" and the electronic blackboard 20c having the terminal ID "02ca".

(Functional Configuration of Transmission Control System)

Next, a functional configuration of the transmission control system 50 will be described using FIG. 17.

The transceiver unit 51 transmits and receives various data items (or information items) with other terminals, devices, or systems via the communication network 2.

The authentication unit 52 authenticates a terminal, by searching in the authentication management DB 5001 in the storage unit 5000, with a terminal ID and a password of the terminal included in a request for login received via the transceiver unit 51 as a search key, and determining whether the same pair of the terminal ID and the password are managed in the authentication management DB 5001.

The creation unit 53 creates a session ID to be used for communication. The determination unit 58 determines whether type information transmitted from a transmission terminal via the transceiver unit 51 is included in type information read out from the terminal management DB 5002 by the access unit 59.

The access unit 59 executes a process for storing various data items in the storage unit 5000, or reading various data items stored in the storage unit 5000.

<<Operations or Processes of Embodiment>>

Figure 22:
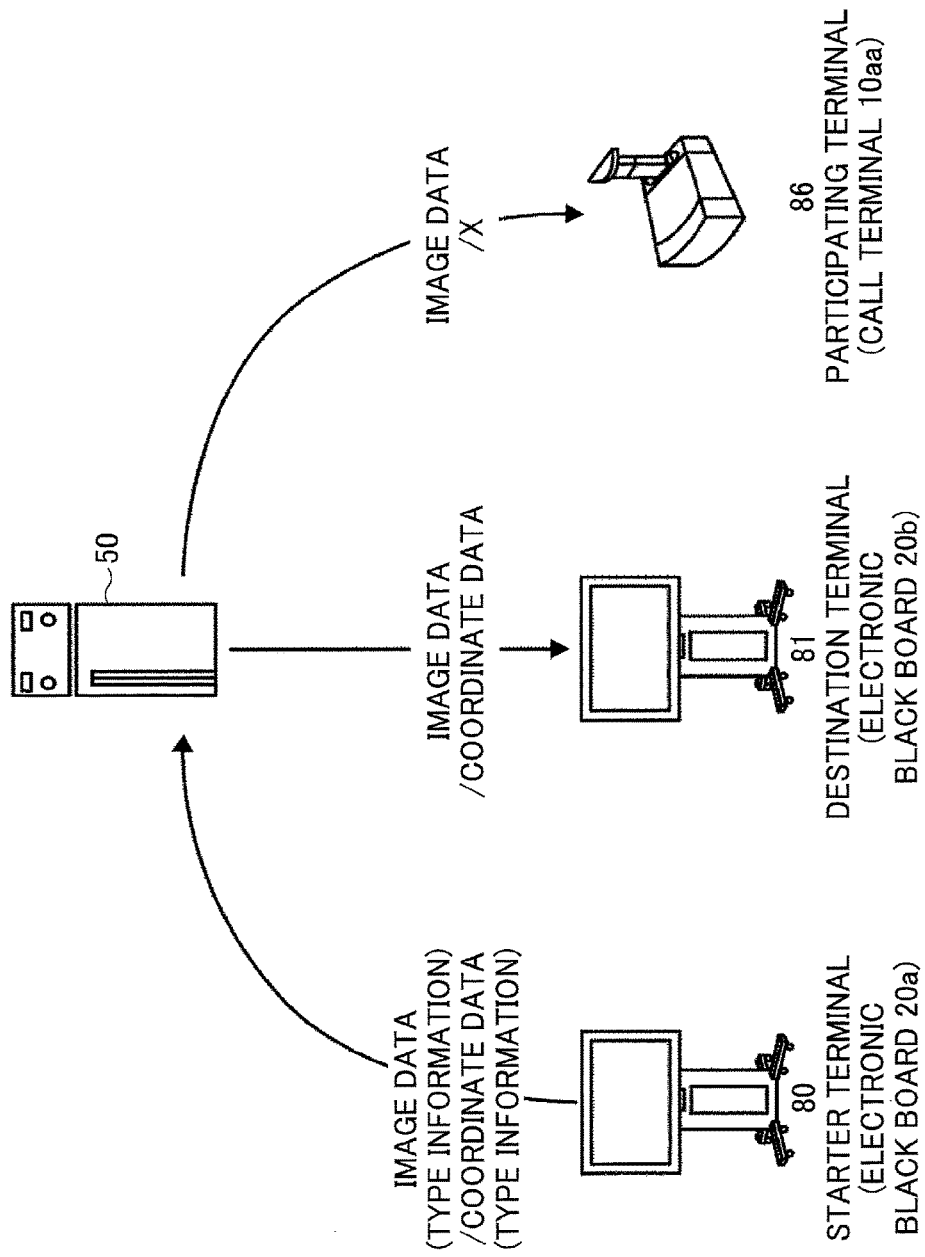
FIG. 22 is a diagram illustrating an overview of operations or processes in an embodiment.

Next, operations and processes of the embodiment will be described using FIG. 22 to FIG. 28. Note that first, an overview of the operations and processes of the embodiment will be described using FIG. 22. FIG. 22 is a diagram illustrating an overview of the operations or processes in the embodiment.

FIG. 22 illustrates a case where a starter terminal 80 starts communication with a destination terminal 81, then, a transmission terminal newly participates in the communication (referred to as the "participating terminal"), and the communication is executed among the three transmission terminals. Here, the case is illustrated in which the starter terminal 80 is the electronic blackboard 20a, the destination terminal 81 is the electronic blackboard 20b, and the participating terminal is the call terminal 10aa.

For example, if the starter terminal 80 transmits contents data to the destination terminal 81 and the participating terminal 86 via the transmission control system 50, the transmission control system 50 determines a transmission terminal that can process (reproduce or the like) the contents data among the destination terminal 81 and the participating terminal 86, based on the type information transmitted along with the contents data from the starter terminal 80, to transmit the contents data to the transmission terminal capable of the processing, and not to transmit the data to the transmission terminal incapable of the processing. Here, the destination terminal 81 can reproduce both image data and coordinates data, and hence, the transmission control system 50 transmits the image data and the coordinates data to the destination terminal 81. On the other hand, the participating terminal 86 can process image data, but cannot process coordinates data, and hence, the transmission control system 50 transmits the image data to the participating terminal 86, but does not transmit the coordinates data.

Figure 23:
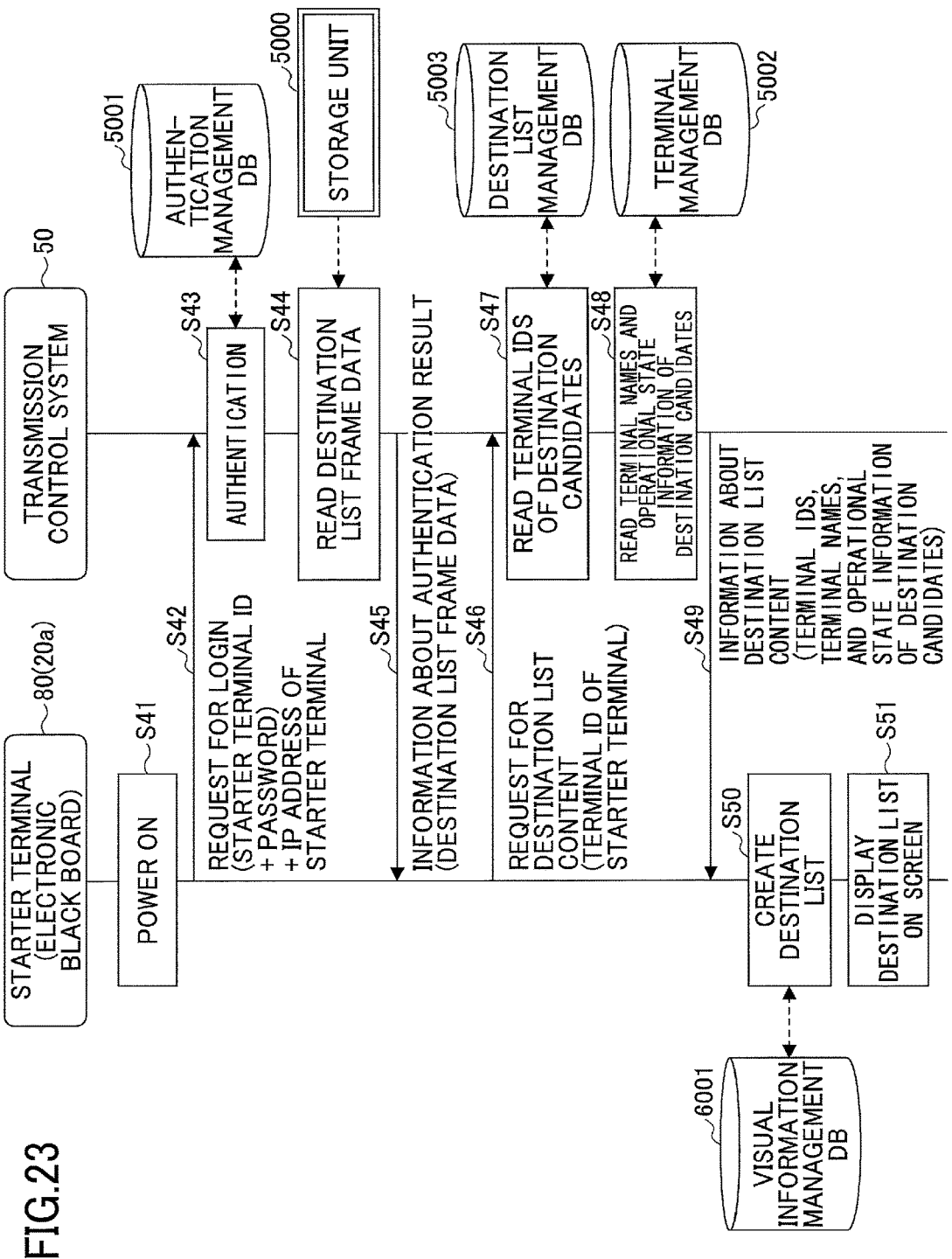
FIG. 23 is a sequence chart illustrating a process in a preparation stage for starting transmission and reception of contents data between transmission terminals.

In the following, the operations or the processes of the embodiment will be described specifically, using FIG. 23 to FIG. 28. FIG. 23 is a sequence chart illustrating a process in a preparation stage for starting transmission and reception of contents data between transmission terminals. FIG. 24 is a schematic view of a destination list screen on the starter terminal 80. FIG. 25 is a sequence chart illustrating a process that starts with selection of a destination candidate, to be ready to start transmission and reception of contents data.

Here, a process for transmitting and receiving management information items in a preparation stage before starting transmission and reception of contents data between the transmission terminal (the electronic blackboard 20a) as the starter terminal 80, and the transmission terminal (the electronic blackboard 20b) as the destination terminal 81 will be described. Note that FIG. 23 and FIG. 25 illustrate processes for transmitting and receiving various management information items, all by the session for management information "sei" illustrated in FIG. 2.

First, a user of the electronic blackboard 20a turns on the power switch (not illustrated) on the electronic blackboard 20a, to turn the power source on (Step S41). Then, upon the power source having been turned on, the login request unit 63 of the electronic blackboard 20a transmits a request for login from the transceiver unit 61 to the transmission control system 50 via the communication network 2 (Step S42). This makes the transceiver unit 51 of the transmission control system 50 receive the request for login. This request for login includes a terminal ID and a password to identify the starter terminal 80 as the electronic blackboard 20a. These terminal ID and password are data items that have been read out of the storage unit 6000 by the access unit 69, and have been transmitted to the transceiver unit 61.

Note that when the request for login is transmitted from the electronic blackboard 20a to the transmission control system 50, the transmission control system 50 on the reception side can obtain the IP address of the electronic blackboard 20a on the transmission side. Also, the request for login is not necessarily started upon the power source having been turned on, but may be transmitted upon input by the user with the electronic pen 4 or the like.

Further, although the terminal ID and password have been read out of the storage unit 6000 to be transmitted, obtainment of the terminal ID and password is not limited as such; the terminal ID and password input by the user with the electronic pen 4 or the like may be transmitted. Also, the terminal ID and password read out of a recording medium connected to the electronic blackboard 20a, such as a SIM (Subscriber Identity Module Card) card and an SD card, may be transmitted.

Next, the authentication unit 52 of the transmission control system 50 authenticates the terminal, by using the terminal ID and the password included in the request for login received via the transceiver unit 51 as a search key for searching in the authentication management table in the storage unit 5000 (see FIG. 18), and determining whether the same terminal ID and password are managed in the authentication management DB 5001 (Step S43). In the embodiment, a case will be described where the authentication unit 52 has determined that the terminal has valid use permission.

If the authentication unit 52 has determined that the same terminal ID and the same password are managed, and hence, the request for login has come from the starter terminal 80 having valid use permission, the access unit 59 reads out destination list frame data from the storage unit 5000 (Step S44).

The transceiver unit 51 transmits information about authentication result representing an authentication result obtained by the authentication unit 52, to the starter terminal 80 (the electronic blackboard 20a) that has made the request for login, via the communication network 2 (Step S45). This makes the transceiver unit 61 of the starter terminal 80 (the electronic blackboard 20a) receive the information about authentication result. This information about authentication result includes the destination list frame data read out at Step S44.

Next, in response to receiving the information about authentication result indicating the authentication result of determination that the terminal has valid use permission, the starter terminal 80 (the electronic blackboard 20a) has the transceiver unit 61 make a request for content of the destination list to the transmission control system 50 via the communication network 2 (Step S46). This makes the transceiver unit 51 of the transmission control system 50 receive the request for the content of the destination list. This request includes the terminal ID of the starter terminal 80 (the electronic blackboard 20a).

Next, the access unit 59 of the transmission control system 50 searches in the destination list management table (see FIG. 20) by using the terminal ID "02aa" of the starter terminal (the electronic blackboard 20a) received at Step S46 as a search key, to read out terminal IDs of all corresponding destination candidates (Step S47). Further, the access unit 59 searches in the terminal management table (see FIG. 19) by using each of the terminal IDs read out at Step S47 as a search key, to read the terminal name and operational state information of the corresponding destination candidate (Step S48).

Next, the transceiver unit 51 of the transmission control system 50 transmits the destination list content information to the starter terminal 80 (the electronic blackboard 20a) via the communication network 2 (Step S49). This makes the transceiver unit 11 of the starter terminal 80 (the electronic blackboard 20a) receive the destination list content information. This destination list content information includes the terminal ID of the destination candidate, and the terminal name and operational state information of the destination candidate read out at Steps S47 and S48, respectively.

Next, the creation unit 67 of the starter terminal 80 (the electronic blackboard 20a) creates a destination list, by using the destination list frame data received at Step S45 and the destination list content information received at Step S49, and outputs the destination list to the image processing unit 30 (Step S50). Then, the display superimposing unit 36 of the image processing unit 30 displays a destination list screen illustrated in FIG. 24 on the display 3 via the video superimposing unit 28 (Step S51).

On this destination list screen, for each of the destination candidates, an icon representing an operational state of the destination candidate, the terminal ID of the destination candidate, and the destination name of the destination candidate are displayed. Among these, the icon representing an operational state is displayed on the destination list screen as the access unit 19 searches in the visual information management table (see FIG. 10) by the operational state information received at Step S49 as a search key, to read the corresponding visual information (the icon). Note that the "terminal name" transmitted from the transmission control system 50 at Step S49 is displayed as the "destination name" on the destination list screen as illustrated in FIG. 24.

Note that Steps S41 to S51 can be processed in substantially the same way not only on the electronic blackboards 20, but also on the call terminals 10.

Next, using FIG. 25, a process will be described that is executed after communication has been started between the transmission terminal (the electronic blackboard 20a) as the starter terminal 80 and the transmission terminal (the electronic blackboard 20b) as the destination terminal 81, to eventually have the transmission terminal (the call terminal 10aa) as the participating terminal 86 participate in the communication.

Figure 24:
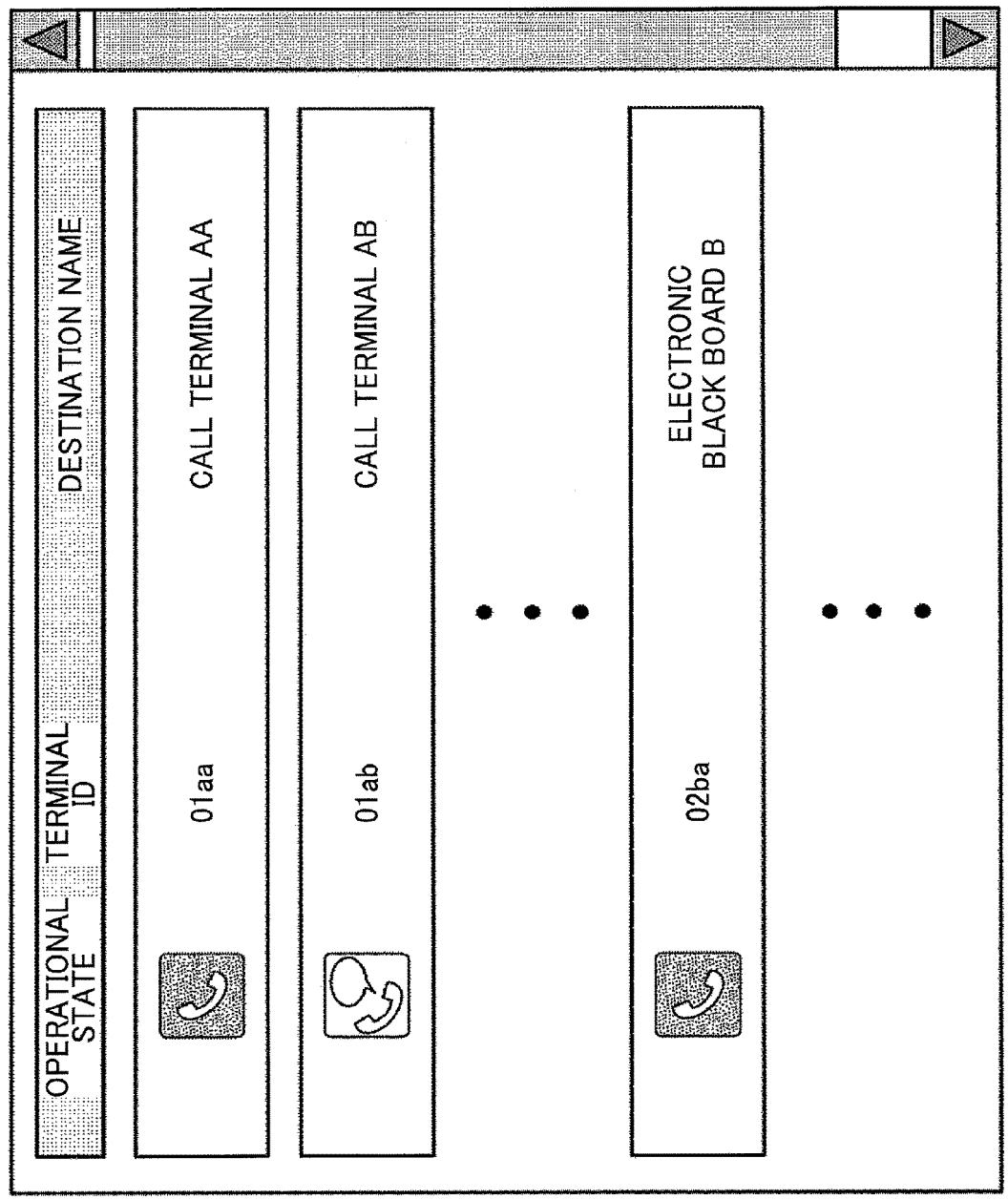
FIG. 24 is a schematic view of a destination list screen on a starter terminal.
Figure 25:
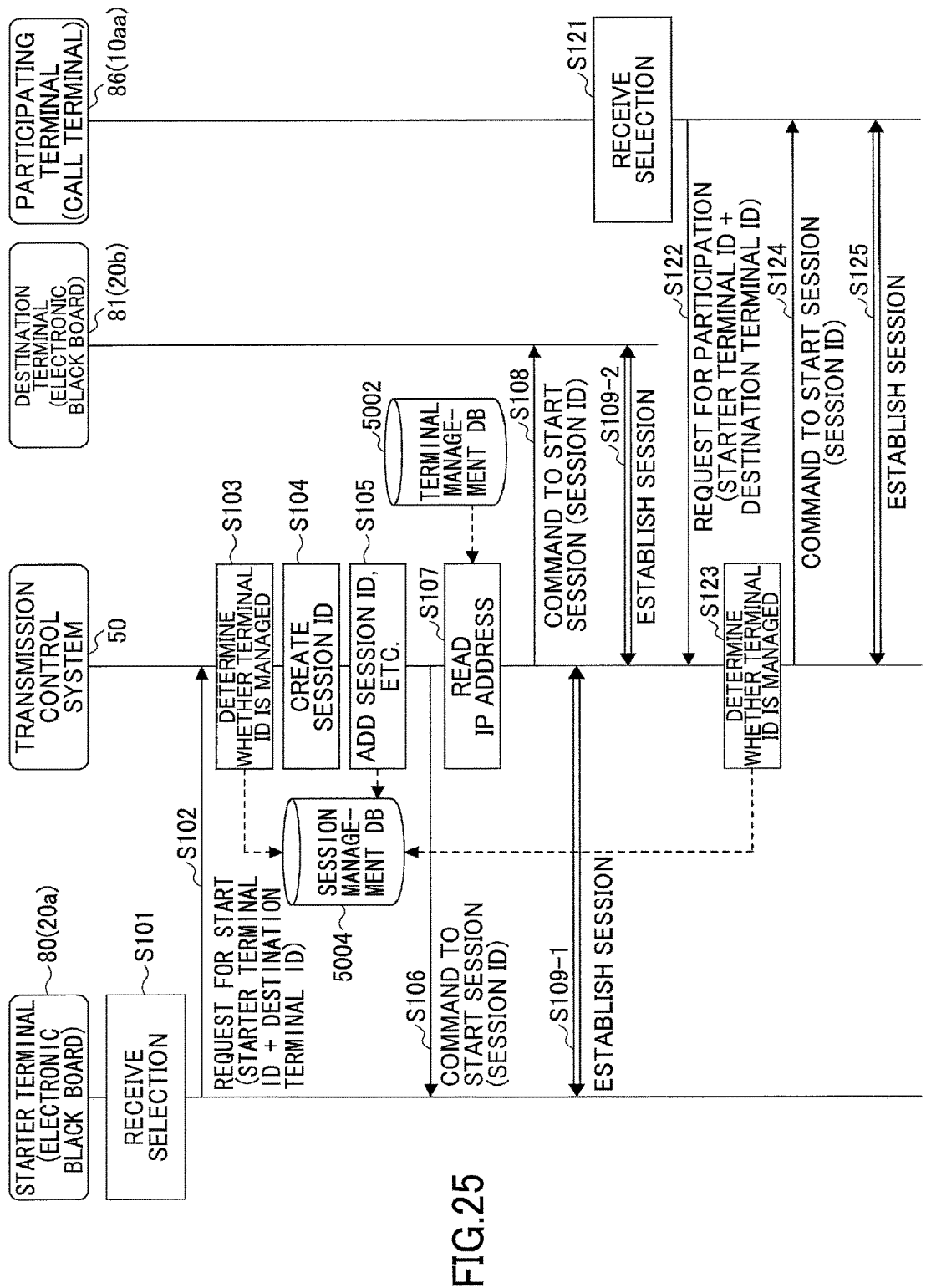
FIG. 25 is a sequence chart illustrating a process that starts with selection of a destination candidate, to be ready to start transmission and reception of contents data.

First, the coordinate detection unit 22 of the starter terminal 80 (the electronic blackboard 20a) receives from the user selection of a destination candidate (here an electronic blackboard B) on the destination list screen illustrated in FIG. 24 (Step S101). Then, the transceiver unit 61 of the starter terminal 80 (the electronic blackboard 20a) transmits a request for start that represents a desire to start transmission and reception of contents data, to the transmission control system 50 (Step S102). This makes the transceiver unit 51 of the transmission control system 50 receive the request for start. Also, the request for start includes the terminal ID of the starter terminal 80 (the electronic blackboard 20a), and the terminal ID of the destination terminal 81 (the electronic blackboard 20b).

Next, the determination unit 58 determines whether the terminal ID of the destination terminal 81 received at Step S102 is managed in the session management table (see FIG. 21) (Step S103). Here, a case will be described where the terminal ID of the destination terminal 81 is not managed. In the case that the terminal ID of the destination terminal 81 is not managed, the creation unit 53 newly creates a session ID (Step S104). Then, the access unit 59 additionally stores a new record in the session management table (see FIG. 21), in which the session ID created at Step S104, and the terminal ID of the starter terminal 80 and the terminal ID of the destination terminal 81 received at Step S102 are associated with each other (Step S105). Here, as illustrated in FIG. 21, by adding the new record, the session ID "se3" and the terminal IDs "02aa" and "02ba" are associated with each other to be managed.

Next, the transceiver unit 51 transmits a session start command that includes the session ID created at Step S104 to the starter terminal 80 (the electronic blackboard 20a) (Step S106). This makes the transceiver unit 61 of the starter terminal 80 (the electronic blackboard 20a) receive the session start command.

Next, the access unit 69 searches in the terminal management table (see FIG. 19) by the terminal ID of the destination terminal 81 (the electronic blackboard 20b) transmitted at Step S102 as a search key, to read the corresponding IP address (Step S107). Then, the transceiver unit 51 transmits a session start command that includes the session ID created at Step S104 to the IP address read out at Step S107 (Step S108). This makes the transceiver unit 61 of the destination terminal 81 (the electronic blackboard 20b) receive the session start command.

By these steps, the starter terminal 80 (the electronic blackboard 20a) and the destination terminal 81 (the electronic blackboard 20b) establish the communication session with the transmission control system 50, respectively (Steps S109-1 and 2).

Next, a process will be described in which the participating terminal 86 (the call terminal 10aa) participates in the communication between the starter terminal 80 (the electronic blackboard 20a) and the destination terminal 81 (the electronic blackboard 20b). Note that FIG. 26 is a schematic view of a destination list screen on the participating terminal 86.

Figure 26:
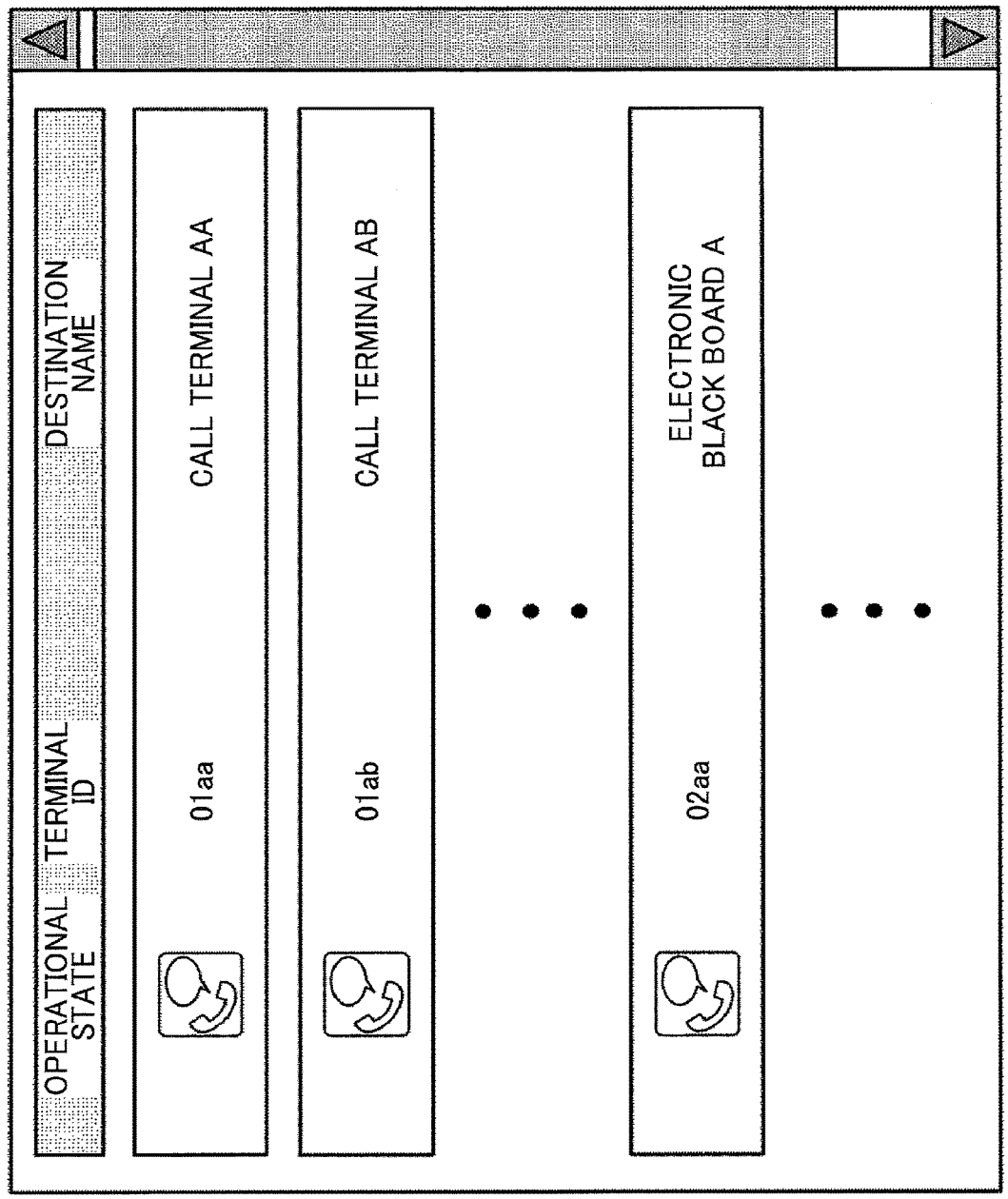
FIG. 26 is a schematic view of a destination list screen on a participating terminal.

First, the operational input reception unit 12 of the participating terminal 86 (the call terminal 10 ca) receives selection of a destination candidate (here, a call terminal AA) on the destination list screen illustrated in FIG. 26 from a user of the participating terminal 86 (the call terminal 10 ca) (Step S121). Then, the transceiver unit 11 of the participating terminal 86 (the call terminal 10 ca) transmits a request for participation that represents a desire to start transmission and reception of contents data, to the transmission control system 50 (Step S122). This makes the transceiver unit 51 of the transmission control system 50 receive the request for participation. Here, the request for participation includes the terminal ID of the participating terminal 86 (the call terminal 10aa), and the terminal ID of the starter terminal 80 (the electronic blackboard 20a). Note that instead of the terminal ID of the starter terminal 80 (the electronic blackboard 20a), the terminal ID of the destination terminal 81 (the electronic blackboard 20b) may be included.

Next, similar to Step S103, the transmission control system 50 has the determination unit 58 determines whether the terminal ID of the starter terminal 80 received at Step S122 is managed in the session management table (see FIG. 21) (Step S123). Here, since the terminal ID of the starter terminal 80 has come to be managed at Step S105, a new session ID is not created as has been done at Step S104.

Next, the transceiver unit 51 transmits a session start command that includes the session ID created at Step S104 to the participating terminal 86 (the call terminal 10aa) (Step S124). This makes the transceiver unit 11 of the participating terminal 86 (the call terminal 10aa) receive the session start command.

By these steps, the participating terminal (the call terminal 10aa) establishes a communication session with the transmission control system 50 (Step S125). This makes it possible for the starter terminal 80 (the electronic blackboard 20a), the destination terminal 81 (the electronic blackboard 20b), and the participating terminal 86 (the call terminal 10aa) to communicate with each other via the transmission control system 50. Thus, the electronic blackboard 20a comes to have two destination terminals 81 that are the electronic blackboard 20b and the call terminal 10aa. Note that among the destination candidates, transmission terminals that have come to actually execute communication become the destination terminals 81.

Figure 27:
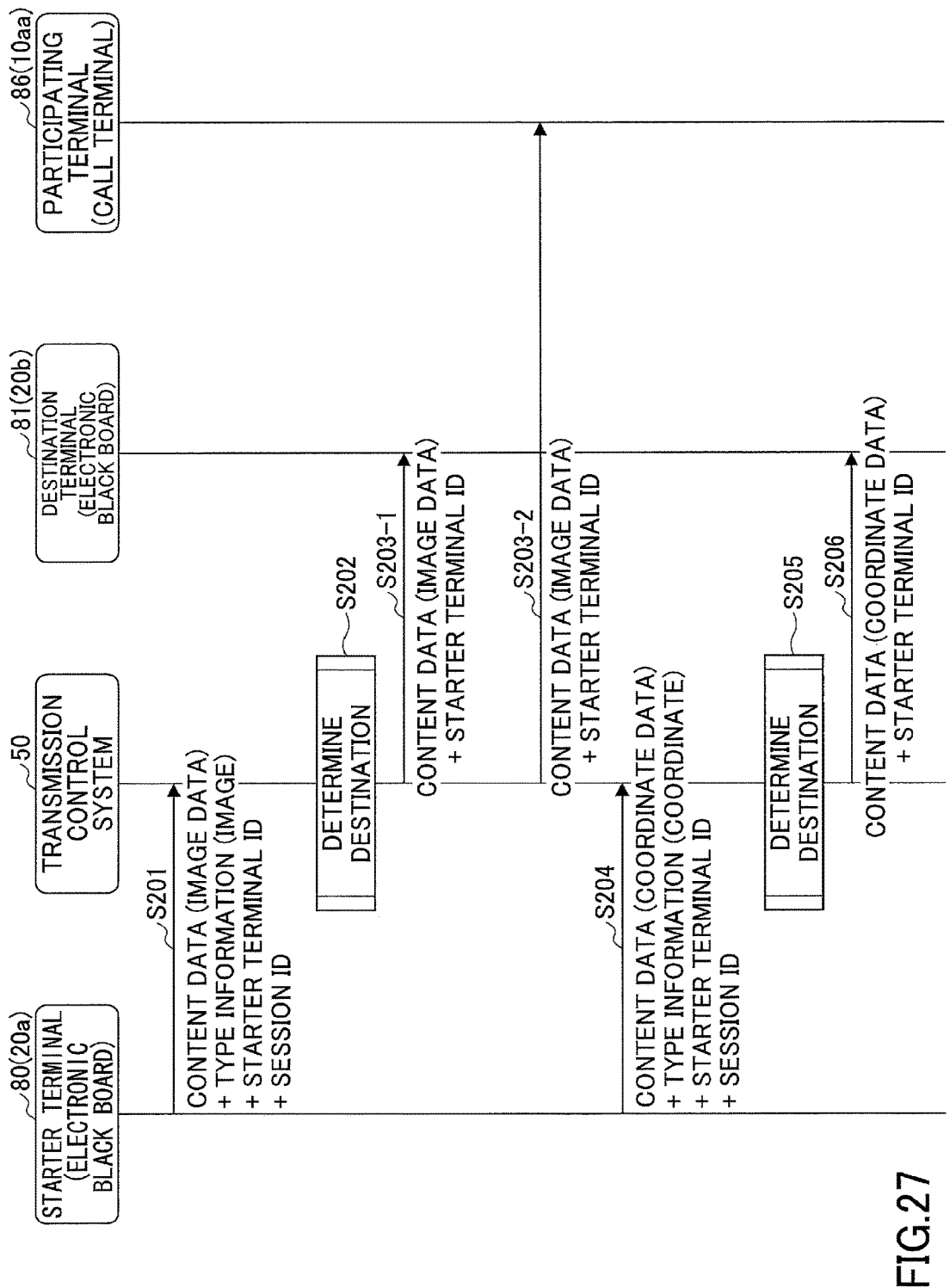
FIG. 27 is a sequence chart illustrating transmission and reception of contents data.

Next, using FIG. 27 and FIG. 28, a case will be described in which the starter terminal 80 transmits contents data to the destination terminal 81 and the participating terminal 86 via the transmission control system 50 by using the communication session established at Steps S109-1, 2, and Step S125. FIG. 27 is a sequence chart illustrating transmission and reception of contents data.

First, the transceiver unit 61 of the starter terminal 80 (the electronic blackboard 20a) transmits contents data, type information that represents the type of this contents data (an example of first type information), the terminal ID of the starter terminal 80 as the transmission source, and the session ID created at Step S104, to the transmission control system 50 (Step S201). Here, image data is transmitted as the contents data, and "image" is transmitted as the type information. This makes the transceiver unit 51 of the transmission control system 50 receive the image data, the type information "image", the terminal ID of the starter terminal 80, and the session ID.

Next, the transmission control system 50 determines the transmission destination of the received contents data (Step S202). Here, using FIG. 28, a process for determining the transmission destination will be described. Note that FIG. 28 is a flowchart illustrating a process of determining the transmission destination.

As illustrated in FIG. 28, the access unit 59 searches in the session management table (see FIG. 21) by the session ID received at Step S201 as a search key, to read the terminals ID of the destination terminals 81 communicating with the terminal itself (the electronic blackboard 20*aa*) (Step S301).

Next, the access unit 59 searches in the terminal management table (see FIG. 19) by each of the terminals ID read at Step S301 as a search key, to read corresponding type information (an example of second type information) (Step S302). Here, type information that represents "image" and "coordinates" is read as the type information associated with the terminal ID of "02ba" of a first destination terminal (the electronic blackboard 20*b*).

Next, the determination unit 58 determines whether the type information received at Step S201 is included in the type information read out at Step S302, to determine whether to transmit the contents data received at Step S201 to the destination terminals 81 (Step S303). In other words, contents data of the type that can be processed for reproduction after received at a destination terminal 81 is transmitted to the destination terminal 81, but contents data of the type that cannot be processed for reproduction after received at the destination terminal 81 is not transmitted to the destination terminal 81.

Next, at Step S303, if the determination unit 58 has determined that the type information received at Step S201 is included in the type information read out at Step S302 (YES at Step S303), the transceiver unit 51 transmits the contents data to the destination terminal 81 (Step S304). On the other hand, at Step S303, if the determination unit 58 has determined that the type information received at Step S201 is not included in the type information read out at Step S302 (NO at Step S303), the transceiver unit 51 does not execute Step S304 (does not transmit the contents data to the destination terminal 81).

Next, the determination unit 58 determines whether the type information of processible contents data has been read for all destination terminals 81 (Step S305). If the determination unit 58 has determined that the type information of processible contents data has not been read for all destination terminals 81 (NO), the process goes back to Step S302 again. At Step S302 for this time, type information that represents "image", "sound", and "text" is read as type information that is associated with the terminal ID of "01aa" of a second destination terminal 81 (the call terminal 10*aa*). On the other hand, at Step S305, if the determination unit 58 has determined that the type information of processible contents data has been read for all destination terminals 81 (YES), the process ends for determining the transmission destination illustrated in FIG. 28.

Next, referring back to FIG. 27, since the electronic blackboard 20*b* and the call terminal 10*aa* can process image data for reproduction, the transceiver unit 51 of the transmission control system 50 transmits the contents data being image data, and the terminal ID of the starter terminal 80 (the electronic blackboard 20*a*) as the transmission source, to both the electronic blackboard 20*b* and the call terminal 10*aa* (Steps S203-1, 2). This makes the transceiver unit 61 of the electronic blackboard 20*b* and the transceiver unit 11 of the call terminal 10*aa* receive the contents data being image data and the terminal ID of the starter terminal 80 (the electronic blackboard 20*a*) as the transmission source.

Next, the transceiver unit 61 of the starter terminal 80 (the electronic blackboard 20*a*) transmits the contents data being coordinates data to the transmission control system 50, and transmits "coordinates" as type information (Step S204), the transmission control system 50 determines the transmission destination similarly as at Step S202 (Step S205). In this case, the electronic blackboard 20*b* can reproduce the coordinates data as a stroke image (B), whereas the call terminal 10*aa* cannot reproduce the coordinates data as a stroke image (B). Therefore, the transmission control system 50 transmits the contents data to the electronic blackboard 20*b* (Step S206), but does not transmit the contents data to the call terminal 10*aa*.

<<Main Effects of Embodiment>>

As described above, according to the transmission system 1 of the embodiment, when a first transmission terminal transmits contents data to a second transmission terminal via the transmission control system 50, the first transmission terminal transmits not only the contents data, but also the type information that represents the type of the contents data. In response to this, the transmission control system 50 determines whether the second transmission terminal can process the contents data, based on the type information. Then, if the second transmission terminal can process the contents data, the transmission control system 50 transmits the contents data to the second transmission terminal; or if the second transmission terminal cannot process the contents data, the transmission control system 50 does not transmit the contents data to the second transmission terminal. Thus, effects are obtained that the transmission control system 50 does not need to execute useless transmission, and congestion of the communication network 2 can be avoided as much as possible.

<<Supplementary Description of Embodiments>>

Note that the transmission control system 50, the program providing system 90, and the maintenance system 100 in the above embodiments may be constituted with a single computer, or may be divided into parts (functional units) to be constituted with multiple computers.

Also, if the program providing system 90 is constituted with a single computer, a program transmitted by the program providing system 90 may be transmitted by partitioning the program into multiple modules, or may be transmitted without partitioning. Further, if the program providing system 90 is constituted with multiple computers, a program may be transmitted from the computers in a state where the program is partitioned into multiple modules.

Further, the transmission system 1 is applicable to any system as long as the system is a communication system in which transmission terminals can communicate with each other. For example, the transmission system 1 is applicable to a TV (video) conference system, a sound conference system, a sound telephone system (including a cellular phone system), a text chat system, a white board share system, and the like. Also, the transmission terminal may be a dedicated terminal for the communication system described above, a terminal specific to games, a personal computer, or a mobile communication terminal. Such mobile communication terminals include smart phones, cellular phone terminals, tablet-type terminals, wearable computer terminals, robots, and the like. Further, such wearable computer terminals include devices having communication functions (wrist watches, eyeglasses, dead-up displays, earphones, caps, gloves, shoes, and bags).

Also the above programs may be recorded on computer-readable recording media such as CD-ROMs as files having a format installable or executable on a computer, to be distributed.

Figure 17:
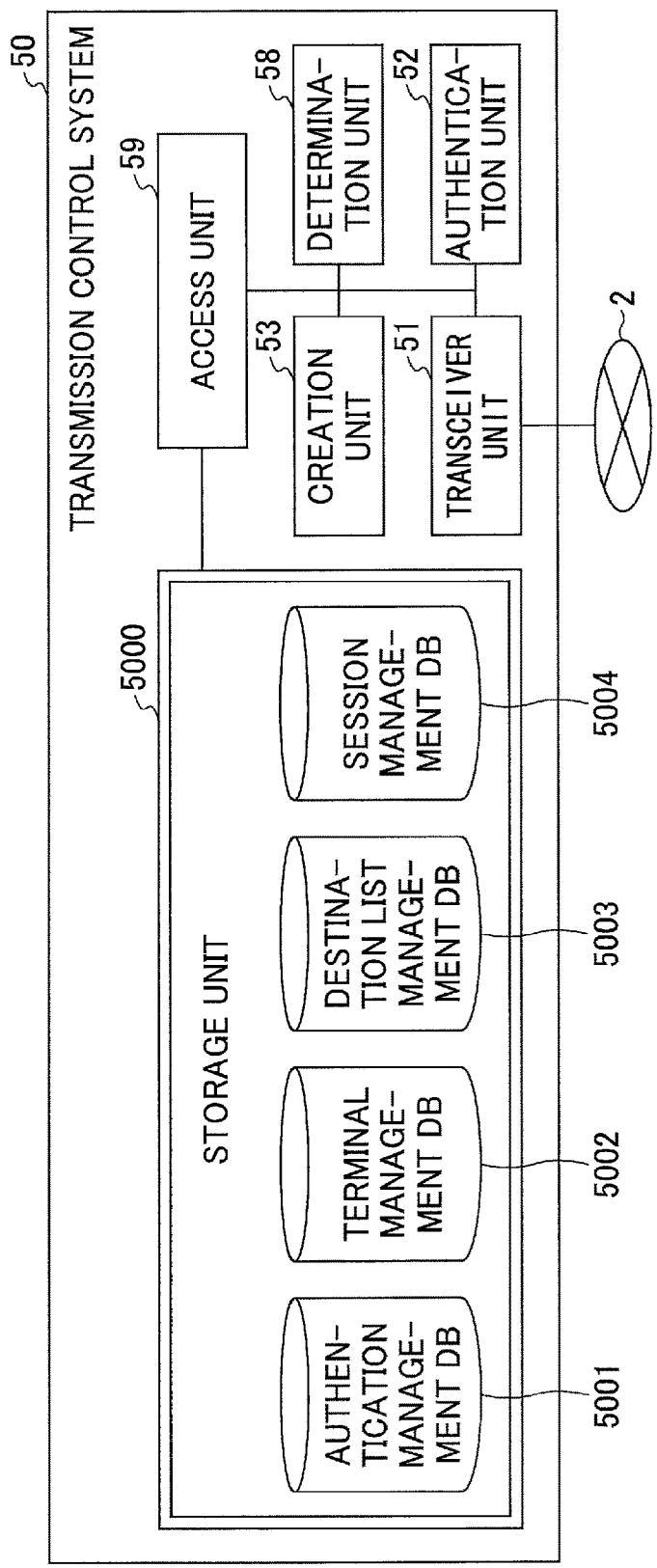
FIG. 17 is a functional block diagram of a transmission control system 50.

Further, in the above embodiments, as illustrated in FIG. 17, the authentication management DB 5001, the terminal management DB 5002, the destination list management DB 5003, and the session management DB 5004 are constituted in the storage unit 5000 in the transmission control system 50, but the DBs are not limited to be constituted as such. For example, at least one of the authentication management DB 5001, the terminal management DB 5002, the destination list management DB 5003, and the session management DB 5004 may be constituted in a storage unit of another server (a system) that is separate from the transmission control system 50. In this case, the access unit 59 of the transmission control system 50 accesses the other server (computer) via the transceiver unit 51, to store and read various information items.

Also, in the above embodiments, the terminal ID is used as an example of identification information, but the identification information is not limited as such; as another example of the identification information, a user ID to identify a user may be used.

Further, in the above embodiments, the authentication management DB 5001, the terminal management DB 5002, the destination list management DB 5003, and the session management DB 5004 are installed on the transmission control system 50, but the installation is not limited as such. For example, at least one of the authentication management DB 5001, the terminal management DB 5002, the destination list management DB 5003, and the session management DB 5004 may be installed on a transmission management system (not illustrated) that can communicate with the transmission control system 50 via the communication network 2. In this case, the access unit 59 can access the various management DBs installed on the transmission management system via the communication network 2.

So far, preferable embodiments and application examples of the present invention have been described in detail. Note that the present invention is not limited to the above specific embodiments and application examples, but various modifications and changes can be made within the scope of the present invention described in the claims.

RELATED-ART DOCUMENTS

Patent Documents

[Patent Document 1] Japanese Unexamined Patent Application Publication No. 2012-075073
[Patent Document 2] Japanese Unexamined Patent Application Publication No. 2013-131204

What is claimed is:

1. A transmission control system for transmitting and receiving data among a plurality of transmission terminals including a first transmission terminal and a second transmission terminal, the transmission control system comprising:
    processing circuitry configured to
        receive identification information to identify the second transmission terminal or a user of the second transmission terminal, the data, and type information that represents a type of the data, from the first transmission terminal; and
        determine whether the second transmission terminal is capable of processing the data, based on the type information received,
    wherein when the processing circuitry has determined that the second transmission terminal is capable of processing the data, the data is transmitted to the second transmission terminal, and when the processing circuitry has determined that the second transmission terminal is incapable of processing the data, the data is not transmitted to the second transmission terminal, and
    wherein when the first transmission terminal is an electronic blackboard and the second transmission terminal is a video-conference terminal, the processing circuitry determines that the second transmission terminal is incapable of processing the data transmitted from the first transmission terminal when the type of the data includes coordinate data.

2. The transmission control system according to claim 1, wherein the type information is information representing that the data is image data, sound data, coordinates data, or text data.

3. The transmission control system according to claim 1, wherein the first transmission terminal or the second transmission terminal is a video-conference terminal, an electronic blackboard, a projector, a car navigation terminal, or a mobile communication terminal.

4. The transmission control system according to claim 3, wherein the mobile communication terminal is a smart phone, a cellular phone terminal, a tablet-type terminal, a wearable computer terminal, or a robot.

5. A method of transmission control executed by a transmission control system capable of transmitting data received from a first transmission terminal to a second transmission terminal, the method comprising:
    receiving, by processing circuitry, identification information to identify the second transmission terminal or a user of the second transmission terminal, the data, and type information that represents a type of the data, from the first transmission terminal; and
    determining, by the processing circuitry, whether the second transmission terminal is capable of processing the data, based on the type information received,
    wherein when the processing circuitry has determined that the second transmission terminal is capable of processing the data, the data is transmitted to the second transmission terminal, and when the processing circuitry has determined that the second transmission terminal is incapable of processing the data, the data is not transmitted to the second transmission terminal, and
    wherein when the first transmission terminal is an electronic blackboard and the second transmission terminal is a video-conference terminal, the processing circuitry determines that the second transmission terminal is incapable of processing the data transmitted from the first transmission terminal when the type of the data includes coordinate data.

* * * * *